United States Patent
Karamcheti et al.

(10) Patent No.: US 9,734,027 B2
(45) Date of Patent: *Aug. 15, 2017

(54) SYNCHRONOUS MIRRORING IN NON-VOLATILE MEMORY SYSTEMS

(71) Applicant: Virident Systems Inc., Milpitas, CA (US)

(72) Inventors: Vijay Karamcheti, Palo Alto, CA (US); Shibabrata Mondal, Bangalore (IN); Swamy Gowda, Bangalore (IN)

(73) Assignee: Virident Systems, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,120

(22) Filed: Sep. 11, 2015

(65) Prior Publication Data

US 2016/0004612 A1    Jan. 7, 2016

Related U.S. Application Data

(63) Continuation of application No. 13/842,079, filed on Mar. 15, 2013, now Pat. No. 9,135,164.

(51) Int. Cl.
*G06F 7/00* (2006.01)
*G06F 11/20* (2006.01)
(Continued)

(52) U.S. Cl.
CPC .......... *G06F 11/2058* (2013.01); *G06F 11/14* (2013.01); *G06F 11/1451* (2013.01);
(Continued)

(58) Field of Classification Search
CPC ..................................................... G06F 12/00
See application file for complete search history.

(56) References Cited

U.S. PATENT DOCUMENTS 3,363,240 A    1/1968    Cola et al.
5,276,835 A    1/1994    Mohan et al.
(Continued)

FOREIGN PATENT DOCUMENTS

WO    WO 2012/096652    7/2012
WO    WO 2012/100087    7/2012

OTHER PUBLICATIONS

International Search Report and Written Opinion in International Application No. PCT/US2014/026773, mailed Aug. 11, 2014, 7 pages.

(Continued)

*Primary Examiner* — Cheng-Yuan Tseng
(74) *Attorney, Agent, or Firm* — Patterson & Sheridan, LLP

(57) ABSTRACT

First data is received for storing in a first asymmetric memory device. A first writing phase is identified as a current writing phase. A first segment included in the first asymmetric memory device is identified as next segment available for writing data. The first data is written to the first segment. Information associated with the first segment is stored, along with information indicating that the first segment is written in the first writing phase. Second data is received for storing in the asymmetric memory. A second segment included in the first asymmetric memory device is identified as the next segment available for writing data. The second data is written to the second segment. Information associated with the second segment and the second memory block is stored along with information indicating that the second segment is written in the second writing phase.

25 Claims, 9 Drawing Sheets

(51) Int. Cl.
*G06F 12/02* (2006.01)
*G06F 11/14* (2006.01)

(52) U.S. Cl.
CPC ...... *G06F 11/2082* (2013.01); *G06F 12/0246* (2013.01); *G06F 2201/84* (2013.01); *G06F 2212/7201* (2013.01); *G06F 2212/7202* (2013.01)

(56) References Cited

U.S. PATENT DOCUMENTS

| | | | |
|---|---|---|---|
| 5,734,861 | A | 3/1998 | Cohn et al. |
| 5,787,466 | A | 7/1998 | Berliner |
| 6,018,779 | A | 1/2000 | Blumenau et al. |
| 6,785,169 | B1 | 8/2004 | Nemati et al. |
| 6,895,490 | B1 | 5/2005 | Moore et al. |
| 7,370,143 | B1 | 5/2008 | Scott |
| 7,613,870 | B2 | 11/2009 | Bartley et al. |
| 7,930,513 | B2 * | 4/2011 | Karamcheti ......... G06F 9/5016 711/101 |
| 7,971,093 | B1 | 6/2011 | Goel |
| 8,055,873 | B2 | 11/2011 | Chu et al. |
| 8,156,299 | B2 | 4/2012 | Okin et al. |
| 8,239,617 | B1 | 8/2012 | Linnell |
| 8,352,673 | B2 | 1/2013 | Chu |
| 8,452,929 | B2 | 5/2013 | Bennett |
| 8,621,145 | B1 | 12/2013 | Kimmel et al. |
| 8,626,987 | B2 | 1/2014 | Jung et al. |
| 8,688,896 | B2 | 4/2014 | Nakamura et al. |
| 8,719,488 | B2 | 5/2014 | Maheshwari |
| 8,756,375 | B2 | 6/2014 | Flynn |
| 9,122,588 | B1 | 9/2015 | Mondal |
| 2004/0094778 | A1 | 5/2004 | Ooishi |
| 2005/0022051 | A1 | 1/2005 | Zane et al. |
| 2005/0041449 | A1 | 2/2005 | Houston |
| 2005/0289197 | A1 | 12/2005 | Kan |
| 2006/0075156 | A1 | 4/2006 | Okski |
| 2006/0155917 | A1 | 7/2006 | Di Sena et al. |
| 2006/0274566 | A1 | 12/2006 | Takashima et al. |
| 2007/0294490 | A1 | 12/2007 | Freitas |
| 2009/0019218 | A1 | 1/2009 | Sinclair et al. |
| 2009/0157989 | A1 | 6/2009 | Karamcheti et al. |
| 2009/0172263 | A1 | 7/2009 | Olbrich et al. |
| 2009/0198874 | A1 | 8/2009 | Tzeng |
| 2009/0313417 | A1 | 12/2009 | Wan |
| 2010/0070729 | A1 | 3/2010 | Ng et al. |
| 2010/0262773 | A1 | 10/2010 | Borchers et al. |
| 2011/0167192 | A1 | 7/2011 | Iyer et al. |
| 2011/0239064 | A1 | 9/2011 | Byom et al. |
| 2012/0079353 | A1 | 3/2012 | Lilkanen et al. |
| 2012/0198138 | A1 | 8/2012 | Okin et al. |
| 2012/0217549 | A1 | 8/2012 | Widjaja |
| 2013/0019057 | A1 | 1/2013 | Stephens |
| 2013/0054853 | A1 | 2/2013 | Wang et al. |
| 2013/0054873 | A1 | 2/2013 | Belluomini |
| 2013/0297852 | A1 | 11/2013 | Fai et al. |
| 2013/0297880 | A1 | 11/2013 | Flynn |
| 2014/0068182 | A1 | 3/2014 | Terry |
| 2014/0181364 | A1 | 6/2014 | Berke et al. |
| 2014/0281121 | A1 | 9/2014 | Karamcheti et al. |
| 2014/0281133 | A1 | 9/2014 | Karamcheti et al. |
| 2014/0281138 | A1 | 9/2014 | Karamcheti et al. |
| 2014/0281152 | A1 | 9/2014 | Karamcheti et al. |
| 2015/0193144 | A1 | 7/2015 | Bilas et al. |
| 2015/0331806 | A1 | 11/2015 | Mondal et al. |
| 2016/0004635 | A1 | 1/2016 | Karamcheti et al. |

OTHER PUBLICATIONS

"Grubb's test for outliers". Wikipedia: The Free Encyclopedia. Wikimedia Foundation, Inc. Feb. 5, 2013. Web Oct. 30, 2014 https://en.wikipedia.org/wiki/Grubbs%27_test_for_outliers.
Cassuto et al., "Codes for asymmetric limited-magnitude errors with application to multi-level flash memories," Retrieved Feb. 3, 2017, from http://www.paradise.caltech.edu/papers/etr088.pdf, 15 pages.
Extended European Search Report for Application No. 14763754.0, dated Jan. 4, 2017, 7 pages.
Extended European Search Report for Application No. 14768560.6, dated Oct. 31, 2016, 8 pages.
International Search Report and Written Opinion in International Application No. PCT/US2014/029053, mailed Aug. 27, 2014, 11 pages.
U.S. Final Office Action for U.S. Appl. No. 13/838,699, dated Oct. 8, 2015, 25 pages.
U.S. Final Office Action for U.S. Appl. No. 13/927,740, dated Aug. 28, 2015, 44 pages.
U.S. Final Office Action for U.S. Appl. No. 14/852,844, dated Feb. 16, 2016, 12 pages.
U.S. Non-Final Office Action for U.S. Appl. No. 13/838,699, dated Apr. 7, 2015, 19 pages.
U.S. Non-Final Office Action for U.S. Appl. No. 13/841,706 dated Apr. 24, 2015, 10 pages.
U.S. Non-Final Office Action for U.S. Appl. No. 13/843,714, dated Dec. 5, 2014, 16 pages.
U.S. Non-Final Office Action for U.S. Appl. No. 13/927,740, dated Feb. 12, 2015, 34 pages.
U.S. Non-Final Office Action for U.S. Appl. No. 13/927,871, dated Feb. 13, 2015, 39 pages.
U.S. Non-Final Office Action for U.S. Appl. No. 14/852,844, dated Oct. 27, 2015, 14 pages.
U.S. Notice of Allowance for U.S. Appl. No. 13/841,706 dated Nov. 3, 2015, 7 pages.
U.S. Notice of Allowance for U.S. Appl. No. 13/842,940 dated Nov. 21, 2014, 9 pages.
U.S. Notice of Allowance for U.S. Appl. No. 13/843,511 dated Dec. 16, 2014, 9 pages.
U.S. Notice of Allowance for U.S. Appl. No. 13/843,714, dated Apr. 27, 2015, 10 pages.
U.S. Notice of Allowance for U.S. Appl. No. 13/927,740, dated Dec. 18, 2015, 10 pages.
U.S. Notice of Allowance for U.S. Appl. No. 13/927,871, dated Sep. 15, 2015, 14 pages.
U.S. Notice of Allowance for U.S. Appl. No. 14/667,804 dated Nov. 27, 2015, 13 pages.
U.S. Notice of Allowance for U.S. Appl. No. 14/852,844, dated Jun. 22, 2016, 8 pages.

* cited by examiner

SYNCHRONOUS MIRRORING IN NON-VOLATILE MEMORY SYSTEMS

CROSS-REFERENCE TO RELATED APPLICATION

This application is a continuation (and claims the benefit of priority under 35 USC 120) of U.S. application Ser. No. 13/842,079, filed Mar. 15, 2013, now allowed, which is incorporated by reference.

TECHNICAL FIELD

This document generally relates to non-volatile memory systems.

BACKGROUND

Computer systems typically use memory modules for storing data. Some of the memory modules are realized by memory cards that include non-volatile computer memory, such as flash memory.

SUMMARY

The present disclosure describes methods, systems and devices for performing synchronous mirroring in non-volatile memory devices by tracking sequence numbers of the most-recently written memory segments. In some implementations, the primary memory device periodically shares the sequence number of the most-recently written memory segment with secondary memory devices that are used for synchronous mirroring. The shared information is stored as a logical construct, referred to as a marker, in a secondary memory device. When a secondary memory device recovers from a crash, the marker known to the recovering memory device is compared with the information on the latest updated segments available at the primary memory device, to determine memory blocks that have been updated at the primary memory device since the secondary memory device crashed.

In one aspect, first data is received for storing in a first asymmetric memory device, wherein latency of read operations is different from the latency of write operations in an asymmetric memory device. A first writing phase is identified as a current writing phase. A first segment included in the first asymmetric memory device is identified as next segment available for writing data, wherein a segment includes a logical mapping of physical memory locations in an asymmetric memory device and is associated with a portion of the physical memory locations that is erased in a single operation. The first data is written to the first segment, wherein the first data is written to a first memory block included in the first segment that is next available for writing data. In connection to writing the first data to the next available memory block in the first segment, information associated with the first segment and the first memory block is stored, along with information indicating that the first segment and the first memory block are written in the first writing phase.

Second data is received for storing in the asymmetric memory. It is identified that the first writing phase has completed and a second writing phase is the current writing phase. A second segment included in the first asymmetric memory device is identified as the next segment available for writing data. The second data is written to the second segment, wherein the data is written to a second memory block included in the second segment that is next available for writing data. In connection to writing the second data to the next available memory block in the second segment, information associated with the second segment and the second memory block is stored along with information indicating that the second segment and the second memory block are written in the second writing phase.

Implementations may include one or more of the following features. A request may be received from a synchronous mirroring module for information on a segment that has been most recently filled with data. In response to the request, it may be determined which of first writing phase and the writing phase has completed and which is the current writing phase. Based on determining that the first writing phase has completed and the second writing phase is the current writing phase, the stored information associated with the first segment and the first memory block may be retrieved. The information associated with the first segment and the first memory block may be sent to the synchronous mirroring module, along with the information indicating that the first segment and the first memory block are written in the first writing phase.

The synchronous mirroring module may send a first query for information on a segment that has been most recently filled with data. The information associated with the first segment and the first memory block may be received in response to the first query. The information associated with the first segment and the first memory block, along with the information indicating that the first segment and the first memory block are written in the first writing phase, may be sent to a second asymmetric memory device that is configured for storing data analogous to the first asymmetric memory device and is connected to the first asymmetric memory device by a network connection. The information associated with the first segment and the first memory block may be stored in the second asymmetric memory device as a first marker in a first memory location that is distinct from memory locations configured for storing data.

The synchronous mirroring module may send a second query for information on a segment that has been most recently filled with data, wherein the second query is sent after the first query is sent. The information associated with the second segment and the second memory block may be received in response to the first query. The information associated with the second segment and the second memory block may be sent to the second asymmetric memory device, along with the information indicating that the second segment and the second memory block are written in the second writing phase. The information associated with the second segment and the second memory block may be stored in the second asymmetric memory device as a second marker in a second memory location that is distinct from memory locations configured for storing data.

Sending the first query or the second query may comprise determining, by the synchronous mirroring module, whether a threshold is reached for querying information on a segment that has been most recently filled with data. Based on determining that the threshold is reached, the first query or the second query may be sent.

The information indicating that the first segment and the first memory block are written in the first writing phase may be stored in the second asymmetric memory device along with the first marker, and the information indicating that the second segment and the second memory block are written in the second writing phase may be stored in the second asymmetric memory device along with the second marker. The first and second memory locations may be selected from the group consisting of random access memory (RAM) and non-volatile asymmetric memory.

A message including a copy of the first marker may be received at the synchronous mirroring module from the second asymmetric memory device. The message may indicated that the second asymmetric memory device has recovered from a stoppage. Based on receiving the message, a new query for information on a segment that has been most recently filled with data may be sent. Information associated with a new segment and a new memory block may be received in response to the new query, wherein the new segment is written during the first writing phase. The information associated with the first segment and the first memory block that is extracted from the received copy of the first marker may be compared with the information associated with the new segment and the new memory block, the comparison performed while writing data in the first writing phase or the second writing phase. Based on the comparison, data stored in the first asymmetric memory device that is not stored in the second asymmetric memory device may be identified. The identified data may be sent to the second asymmetric memory device.

The copy of the first marker received from the second asymmetric memory device may include the information indicating that the first segment and the first memory block are written in the first writing phase. Sending the new query may comprise sending the new query for information on a segment that has been most recently filled with data in the first writing phase.

Data may be written to the new segment and the new memory block at a later time compared to data that is written to the first segment and the first memory block. Identifying data stored in the first asymmetric memory device that is not stored in the second asymmetric memory device may comprise identifying, based on comparing the information associated with the first segment and the first memory block with the information associated with the new segment and the new memory block, physical memory blocks that have been written in the first asymmetric memory device since the first marker was sent the second asymmetric memory device and before the copy of the first marker was received from the second asymmetric memory device. A lookup of logical memory blocks in the first asymmetric memory device corresponding to the identified physical memory blocks may be performed using a translation table associated with the first asymmetric memory device. It may be determined whether the logical memory blocks hold valid data. The identified physical memory blocks and the corresponding logical memory blocks may be sent to the second asymmetric memory device based on determining that the logical memory blocks hold valid data.

A physical memory block may include a write page. The translation table may provide a mapping of segments and write pages to logical memory blocks in an asymmetric memory device. One or more of the first segment and the second segment may be selected for storing data in the first writing phase and the second writing phase.

The information associated with the first segment and the first memory block may include a first sequence number associated with the first segment, and a second sequence number associated with the first block in the first segment. The second sequence number may be an offset from an initial block in the first segment.

Each of the first and second asymmetric memory devices may include a flash-based memory system.

In another aspect, first data is received for storing in a first asymmetric memory device, wherein latency of read operations is different from the latency of write operations in an asymmetric memory device. A first segment included in the first asymmetric memory device is identified as next segment available for writing data, wherein the first segment is written as part of a first group of segments, and wherein a segment includes a logical mapping of physical memory locations in an asymmetric memory device and is associated with a portion of the physical memory locations that is erased in a single operation. The first data is written to the first segment, wherein the first data is written to a first memory block included in the first segment that is next available for writing data. connection writing the first data to the next available memory block in the first segment, information associated with the first segment and the first memory block are stored.

Second data is received for storing in the asymmetric memory. It is determined that the first segment is full with data stored in the first segment. Based on determining that the first segment is full, a second group of segments in the first asymmetric memory device is selected, wherein data is written to the second group of segments alternately with the first group of segments. A second segment included in the second group of segments is identified as the next segment available for writing data. The second data is written to the second segment, wherein the data is written to a second memory block included in the second segment that is next available for writing data. In connection to writing the second data to the next available memory block in the second segment, information associated with the second segment and the second memory block is stored.

Implementations may include one or more of the following features. A request from a synchronous mirroring module may be received for information on a segment that has been most recently filled with data. In response to the request, it may be determined which of first segment and the second segment has been most recently filled with data. Based on determining that the first segment has been filled with data most recently, the stored information associated with the first segment and the first memory block may be retrieved. The information associated with the first segment and the first memory block may be sent to the synchronous mirroring module.

The synchronous mirroring module may send the first data and the second data to a second asymmetric memory device, wherein the second asymmetric memory device is configured for storing data analogous to the first asymmetric memory device, and wherein the first asymmetric memory device and the second asymmetric memory device are connected by a network connection. The synchronous mirroring module may determine whether a threshold is reached for querying information on a segment that has been most recently filled with data. Based on determining that the threshold is reached, the request for information on a segment that has been most recently filled with data may be sent. The information associated with the first segment and the first memory block may be received in response to the request. The information associated with the first segment and the first memory block may be sent to the second asymmetric memory device. The information associated with the first segment and the first memory block may be stored in the second asymmetric memory device as a first marker in a memory location that is distinct from memory locations configured for storing data.

A message including a copy of the first marker may be received at the synchronous mirroring module and from the second asymmetric memory device. The message may indicate that the second asymmetric memory device has recovered from a stoppage. Based on receiving the message, a new request for information on a segment that has been most recently filled with data may be sent. Information associated with a new segment and a new memory block in response to the new request may be received, wherein the new segment is included in the first group of segments. The information associated with the first segment and the first memory block that is extracted from the received copy of the first marker may be compared with the information associated with the new segment and the new memory block. The comparison may be performed while writing data to a segment included in the second group of segments. Based on the comparison, data stored in the first group of segments in the first asymmetric memory device that is not stored in the second asymmetric memory device may be identified. The identified data may be sent to the second asymmetric memory device.

Data may be written to the new segment and the new memory block at a later time compared to data that is written to the first segment and the first memory block. Identifying data stored in the first group of segments in the first asymmetric memory device that is not stored in the second asymmetric memory device may comprises identifying, based on comparing the information associated with the first segment and the first memory block with the information associated with the new segment and the new memory block, memory blocks in segments included in the first group of segments that have been written in the first asymmetric memory device since the first marker was sent the second asymmetric memory device and before the copy of the first marker was received from the second asymmetric memory device. A lookup of physical memory locations in the first asymmetric memory device corresponding to the identified memory blocks in the first group of segments may be performed using a translation table associated with the first asymmetric memory device. It may be determined whether the physical memory locations hold valid data. The valid data may be retrieved from the physical memory locations.

A memory block may include a write page. The translation table may provide a mapping of segments and write pages to physical memory locations in an asymmetric memory device. Data may be stored in a segment included in the second group of segments only when a segment included in the first group of segments where data is most recently stored is full.

Information associated with the first segment and the first memory block may include a first sequence number associated with the first segment, and a second sequence number associated with the first block in the first segment. The second sequence number may be an offset from an initial block in the first segment.

In another aspect, first data is received for storing in a first asymmetric memory device, wherein latency of read operations is different from the latency of write operations in an asymmetric memory device. A first segment included in the first asymmetric memory device is identified as next segment available for writing data. A segment includes a logical mapping of physical memory locations in an asymmetric memory device and is associated with a portion of the physical memory locations that is erased in a single operation.

The first data is written to the first segment. The first data is written to a first memory block included in the first segment that is next available for writing data. In connection to writing the first data to the next available memory block in the first segment, information associated with the first segment and the first memory block is stored.

Particular implementations may include one or more of the following features. A request from a synchronous mirroring module may be received for information on a segment that has been most recently filled with data. In response to the request, the stored information associated with the first segment and the first memory block may be retrieved. The information associated with the first segment and the first memory block may be sent to the synchronous mirroring module.

The synchronous mirroring module may send a first query for information on a segment that has been most recently filled with data. The information associated with the first segment and the first memory block may be received in response to the first query. The information associated with the first segment and the first memory block may be sent to a second asymmetric memory device that is configured for storing data analogous to the first asymmetric memory device and is connected to the first asymmetric memory device by a network connection. The information associated with the first segment and the first memory block may be stored in the second asymmetric memory device as a first marker in a first memory location.

Sending the first query may comprise determining, by the synchronous mirroring module, whether a threshold is reached for querying information on a segment that has been most recently filled with data. The first query may be sent based on determining that the threshold is reached.

Each of the first and second asymmetric memory devices may include a flash-based memory system.

A message including a copy of the first marker may be received at the synchronous mirroring module and from the second asymmetric memory device. The message may indicate that the second asymmetric memory device has recovered from a stoppage. Based on receiving the message, a new query for information on a segment that has been most recently filled with data may be sent. Information associated with a new segment and a new memory block may be received in response to the new query. The information associated with the first segment and the first memory block that is extracted from the received copy of the first marker may be compared with the information associated with the new segment and the new memory block. Based on the comparison, data stored in the first asymmetric memory device that is not stored in the second asymmetric memory device may be identified. The identified data may be sent to the second asymmetric memory device.

Data may be written to the new segment and the new memory block at a later time compared to data that is written to the first segment and the first memory block. Identifying data stored in the first asymmetric memory device that is not stored in the second asymmetric memory device may comprises identifying, based on comparing the information associated with the first segment and the first memory block with the information associated with the new segment and the new memory block, physical memory blocks that have been written in the first asymmetric memory device since the first marker was sent the second asymmetric memory device and before the copy of the first marker was received from the second asymmetric memory device. Logical memory blocks in the first asymmetric memory device corresponding to the identified physical memory blocks may be looked up using a translation table associated with the first asymmetric memory device. It may be determined whether the logical memory blocks hold valid data. The identified physical memory blocks and the corresponding logical memory blocks may be sent to the second asymmetric memory device based on determining that the logical memory blocks hold valid data.

A physical memory block may include a write page. The translation table may provide a mapping of segments and write pages to logical memory blocks in an asymmetric memory device. The information associated with the first segment and the first memory block may include a first sequence number associated with the first segment, and a second sequence number associated with the first block in the first segment. The second sequence number may an offset from an initial block in the first segment.

Implementations of the above techniques include one or more methods, computer program products and system. A computer program product is suitably embodied in a non-transitory machine-readable medium and includes instructions executable by one or more processors. The instructions are configured to cause the one or more processors to perform the above described actions.

A system includes one or more processors and instructions embedded in a non-transitory machine-readable medium that are executable by the one or more processors. The instructions, when executed, are configured to cause the one or more processors to perform the above described actions. The system also includes one or more modules that are configured to perform the above described actions. The modules may be associated with instructions embedded in non-transitory machine-readable media that are executable by the one or more processors.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
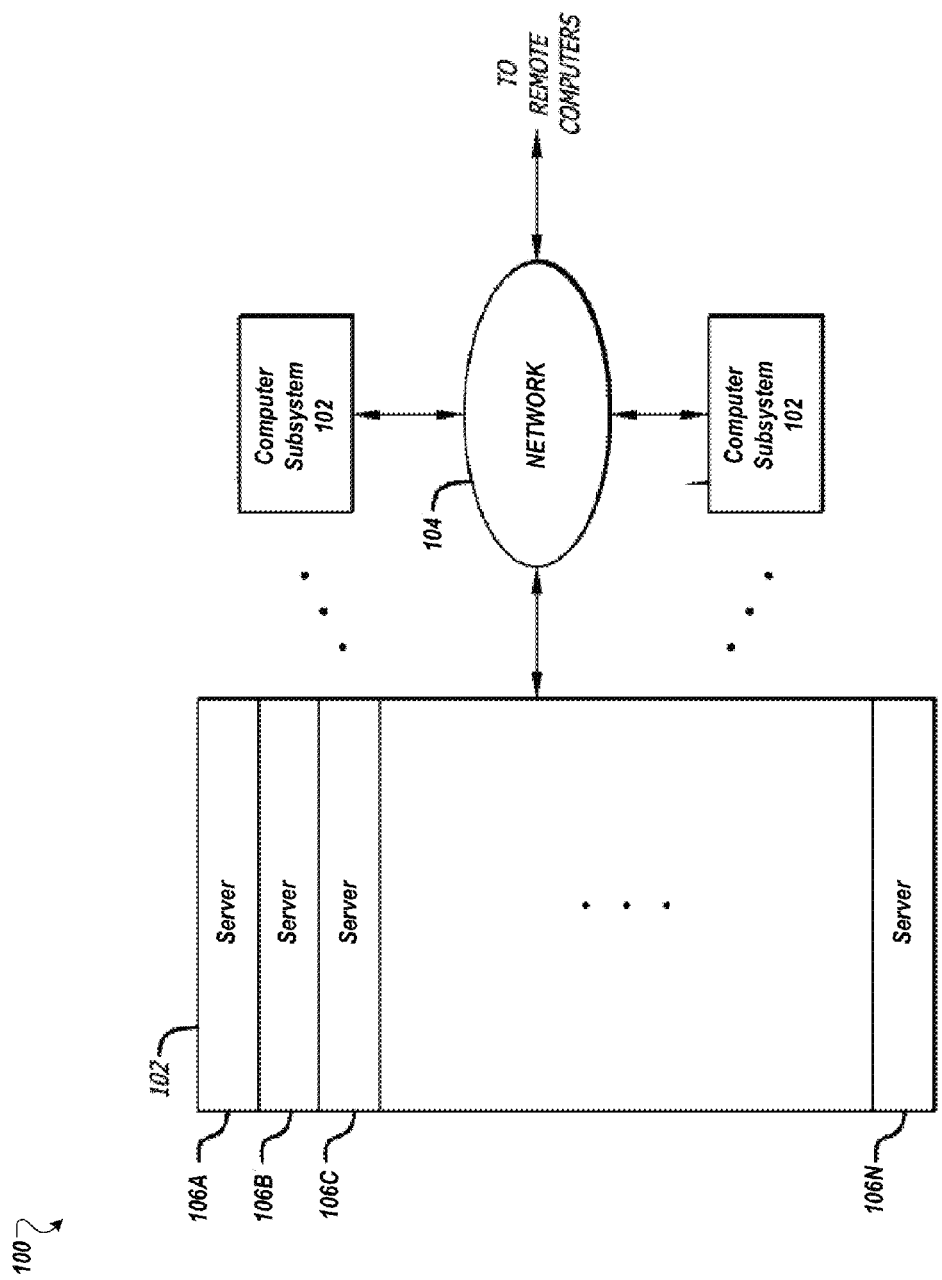
FIG. 1 illustrates an example of a system that uses flash memory for storing data.

Computer systems generally include memory modules that are used in the storage of data and instructions. The memory modules include dynamic random access memory (DRAM) integrated circuits (ICs), which are volatile memory typically used for temporary data storage during processing, and magnetic storage disks for longer term data storage. In some computer systems, in addition or as an alternative to DRAM and magnetic storage disks, non-volatile random access memory (NVRAM) systems are used for data storage. NVRAM may be configured to provide high-performance read access with a granular degree of access that is comparable to DRAM. At the same time, NVRAM may offer large non-volatile storage capacity, which is comparable to magnetic storage disks, while providing high-density storage that utilizes less physical space as compared to magnetic storage disks. In addition, NVRAM may consume less power than DRAM and magnetic storage disks. Realizations of NVRAM in computer systems include flash memory, such as NAND flash and NOR flash memory, and phase change memory, among others.

In some implementations, a flash memory device includes one or more memory cards on which flash memory dice, which are integrated circuit memory chips, are affixed. In this context, a memory die may be represented or referenced as a memory chip, and the two terms "die" and "chip" may be used interchangeably. A flash memory device may be represented or referenced as one memory card on which flash memory dice are affixed, and the terms "flash memory device," "flash memory card," "memory device" and "memory card" may be used interchangeably.

Some computer systems that process data on a large scale, such as enterprise computer systems or server farms, may use large amounts of memory. Such systems may use memory devices hosting multiple memory cards, with a large number of flash memory dice or chips on each card. The computer systems may implement techniques like data striping, data mirroring, and parity encoding (akin to Redundant Array of Independent Disks (RAID)) in order to provide performance improvement and data reliability.

In one sense, data striping may refer to a technique of breaking logically sequential data, such as a file, in a manner such that management and access to sequential logical segments are stored and accessed from locations in different physical storage devices, such as different flash memory dice mounted on a memory card. Each logical portion of data thus created by striping is referred to as a data stripe.

Data mirroring is the replication of logical memory volumes onto separate physical memory in real time to ensure continuous availability. A mirrored volume is a complete logical representation of separate volume copies. One type of data mirroring that is used in flash memory devices is synchronous mirroring, in which data that is stored in a primary memory device is cloned or replicated in one or more secondary memory devices. In some implementations, synchronous mirroring is implemented using a two-server system or a multi-server system where, when writes are going on in a memory card that is resident in one of the servers, the data being written are also dispatched to a second server over a network link where the same operation gets carried out against that memory card on the second server, so that if the first server fails the second server is able to take over and resume operations without losing any in-progress writes. The write operations on the two servers happen concurrently.

In a synchronous mirroring system, the primary memory device may be referred to as the active server, while a secondary memory device may be referred to as the passive server. Logic on the active and passive servers coordinates a write operation for storing application data against both the local storage in the active server and the remote storage in the passive server. The system has to wait for the write operation to complete against both the local storage in the active server, as well as the remote storage in the passive server. The write operation is acknowledged to the issuing application or the operating system only when both operations have completed. Due to synchronous mirroring, a memory write operation may appear to take longer because the write operation is performed on the local storage and the remote storage.

Failures may happen in synchronous mirroring systems and can take many forms. For example, the local storage element in the active server may crash, but the network connection with the passive servers is operational, as are the passive servers and the remote storage element. As another example, the network connection may fail such that the write operation is executed only on the local storage in the active server but not on the remote storage in the passive servers. Alternatively, the write operation may have been transmitted over the network, but before the operation was received by the remote end, the passive server crashed.

A synchronous mirroring system should be able to recreate a state where, after a crash has happened and the failed memory device has been replaced or the server has been rebooted, the storage elements on the active and the passive servers continue to be in synchronization. In this context, being in synchronization refers to the guarantee provided by the system that, when a particular logical block address corresponding to a memory block is queried on the active and passive servers, the application or the operating system will effectively get the same data contents in both the active and passive servers. This property has to be guaranteed independent of device failures or other disaster situations.

In some traditional memory systems, synchronization between the active and passive servers is maintained by performing a full synchronization operation upon recovery from a crash. In a full synchronization operation, the system assumes that the active and passive servers have been completely diverged with regards to their states when at least one of the servers has restarted after a stoppage. The system determines, using some suitable mechanism, one of the servers as corresponding to the new active server, and then copies all the contents of the memory from the active server to the passive server.

A full synchronization operation can be inefficient, for example in a scenario where the two servers have been working in a synchronized mode for a long period before a crash happens. It may take the system a few seconds to recover from that crash, at which time the system determines that all the writes, which happened in the period prior to the crash, on the newly-determined passive server are lost. Consequently, a lot of information has to be transferred from the new active server to the passive server to bring the two ends back in synchronization. This results in a high downtime, which may be unacceptable in many situations.

Some memory systems perform partial synchronization or an incremental re-synchronization to avoid the drawbacks of full synchronization. The objective of partial synchronization or incremental re-synchronization is to synchronize the data stored in the active and passive servers, which are at risk during the time that a crash or some other outage happened. For instance, the memory system may have an input/output (I/O) rate of about a gigabyte per second and if the synchronization was out for about a second, then to the first order the two sides of the synchronous mirroring pair should be resynchronized by sending approximately a gigabyte of data, which is the data that might have been at risk because the crash happened somewhere in the middle in that 1 second period.

In partial synchronization, when the active and passive servers re-establish connection after an outage, the two ends query each other to determine which memory blocks may have changed on one end of the connection that the other end of the connection has not seen. In some memory systems, partial synchronization is achieved by using a disaster recovery log (DRL). In such systems, in addition to writing data to the memory blocks, a log-based structure is maintained on the active node, which records information about the memory blocks on the active storage site that are going to be updated, and follows that up with another notation when the updates have been made on both ends of the connection. For example, a write I/O operation might update data corresponding to logical block address (LBA) X. Therefore, the system will make an entry in a metadata structure, which is maintained in a log-based manner, that LBA X is being updated; then the system would perform the operation on the physical memory location corresponding to LBA X; and after acknowledgements are received from both active and passive ends of the connection that LBA X has been updated, the system records that LBA X has been updated on both ends of the connection. Consequently, the entry in the metadata structure corresponding to the LBA that is being updated gets removed only when both copies have been returned.

When a partial synchronization is performed in a system that implements the DRL, the system looks in the DRL and examines entries for which it is indicated that there is a write that has been initiated, but there is not another indication the log that the write has completed. For all such entries, the corresponding data potentially have to be resynchronized.

In synchronous mirroring systems, situations may arise when the passive server is not responding or known not to be active. This may be the case, for example, when the connection between the active server and the passive server has been broken, or because the passive server has crashed. In such cases, the active server may be aware that the passive server is not active or is no longer online. The system may handle such situations by using a second data structure in addition to the DRL, which may be referred to as the un-replicated write log.

The un-replicated write log maintains information on the stored blocks at the active server that are not known to the passive server because such blocks are written at a time when the passive server is down. Therefore, when the passive server recovers, the active end can play back all the un-replicated writes using the un-replicated write log to determine quickly the blocks that are to be written to the passive end.

In some implementations, optimization is performed by combining the un-replicated write log with the DRL. Such systems recognize un-replicated writes as those write operations for which the second notation is not received from the passive server.

In some other implementations, optimization is performed by trading off between the precision of the DRL and ways of storing the DRL efficiently. For example, write operations may be performed at granularity of 4 kilobytes (KB), but information may be stored in the DRL at the granularity of a megabyte. Therefore, in contrast to an implementation that records information in the DRL at the granularity of 4 KB, the number of entries made to the DRL for the megabyte-granularity is approximately 256 times less for the same amount of write operations that are performed to the memory, and considerably less overhead in writing to the DRL, at the expense of greater imprecision in the information that is recorded in the DRL. When the system recovers from a crash, the system will have to transfer at least a megabyte of data to bring the two ends back in synchronization, since more fine-grained information is not available in the DRL.

Using the disaster recovery log and/or the un-replicated write log may add to the overhead for performing write operations in memory systems that implement synchronous mirroring, due to the latency involved in performing the log writes. It may be useful to design memory systems that provide partial synchronization without using the disaster recovery log and/or the un-replicated write log. In some implementations, such a memory system may be implemented by using data structures that are present in the memory system for various other uses, such as data structures provided by the flash translation layer.

In some implementations, data is written to a flash memory device in a log manner, that is, the memory blocks may be arranged in sequence such that it can be determined, by reading the sequence numbers associated with the memory blocks, whether a particular memory block was written earlier or later than another memory block. The logical arrangement that is the result of the writing the memory blocks in sequence resembles a log structure, such that data structures are available in the flash management layer that provide the information similar to the information provided by the disaster recovery log and the un-replicated write log in memory devices that use the DRL and the un-replicated write log. Because the flash management layer provides similar information, there is no need to have an additional disaster recovery log or an additional un-replicated write log being maintained at runtime.

Generally, a flash memory card is organized into multiple packages and a package includes multiple flash memory dice. A flash memory die is composed of multiple die planes. A die plane is effectively a way for the flash manufacturers to be able to replicate the same memory area and control circuitry in a parallel fashion within the same flash memory die in order to drive capacities.

A die plane includes multiple erase blocks. An erase block is the smallest physical unit of flash that can be erased at a time. Each erase block includes multiple write pages, where a write page is the smallest physical section of a flash memory die that may be accessed at a time for performing a memory write operation. Depending on the technology of the memory device, the size of the write page may be 8, 16 or 32 KB per device. A write page, in turn, may be composed of several read pages.

For various considerations that include performance, redundancy and reliability, the flash memory management logic may aggregate a group of flash memory dice into a RAID configuration. When performing a write operation, the application data is written or "striped" to write pages distributed across the group of flash memory dice. For example, in one striping scheme, the application data may be written to write pages in each of eight flash memory dice in a RAID stripe, where the size of a write page is 8 KB. Therefore, effectively the smallest unit that can be written to a RAID-striped flash memory device may be on the order of 8×8 KB, that is, 64 KB, or more.

In some implementations, a physical region of a flash memory device may be logically identified as a flash segment, also referred to as a segment. A flash segment is an aggregation of one or more erase blocks times the width of the RAID stripe. For example, a segment may span two erase blocks in each flash memory die in a RAID stripe. The size of an erase block may be about 2 MB and the RAID stripe may include eight flash memory dice. Therefore, the size of a segment is about 32 MB.

In some implementations, a flash segment is the granularity at which areas of a flash memory device are erased and managed. When new application data are received, the flash memory device writes one physical block, then the next physical block, then the next physical block, until some portion of the memory device is filled up, and then the memory management performs garbage collection on previously filled-in portions of the flash memory dice.

When garbage collection is performed on a portion of flash memory dice, the system relocates the valid data out of that portion, erases the associated blocks and places the memory portion back into service so that it is able to receive new writes. The segment is the minimum unit at which level the flash management layer erases portions of the flash memory dice. Although physically flash can be erased at the level of erase blocks, flash management layer uses a segment since that allows more than one erase block to be erased at a time.

In this context, the flash management layer is synonymous with the flash translation layer, which includes a collection of hardware and software logic that are configured to manage the physical locations in the flash memory device, such as the flash memory dice, and interface the physical memory with higher level applications and the operating system. In some implementations, the flash management layer includes a master controller for managing the flash memory dice, and several slave controllers, each of which are associated with a subset of the flash memory dice.

The flash management layer also includes software embedded in the flash memory device (that is, firmware) such as the flash translation table. The granularity at which DRAM pages or file system blocks get managed in flash memory die devices is commonly referred to as a translation unit, which is a logical construct specific to the implementation of the flash management layer for the flash storage device. The translation table maps a logical block address (LBA) to a physical block number (PBN), denoting a physical flash location. The flash management layer maintains the translation table internally, usually at a fixed block granularity, that is, fixed-size LBAs are mapped to fixed-size PBNs. This fixed granularity of translation is referred to as the translation unit. The overall system may be made more efficient by selecting the translation unit to be the same size as the expected data access size from applications or the operating system. At the level of applications and operating systems that store data in flash memory devices, the natural block size of data access falls into several categories, with one common size being 4 KB. Therefore, in some implementations, the translation unit is configured to be 4 KB in size.

In some implementations, header information may be associated with each segment. The header information may be a sequence number. For example, the flash memory dice may be managed as segment number 1, segment number 2, segment number 3, and so on. By associating a sequence number with each segment, the flash management can effectively associate with each segment the time order in which it was placed into service in order to receive new writes. Consequently, depending on which segment a write page belongs to, the flash management may determine that a write page in a segment with a lower sequence number was written before a write page in a segment with a higher sequence number. This generates a time order for write pages in flash memory dice as to when they got written, which is referred to previously as the flash memory device being written in a log manner, since a log is normally written in sequence from the beginning of the log onward.

At a point in time, some segments in a flash memory device are completely written, there are some segments that are being actively written, and there are some segments that are in clean state and they have not yet been written at all. The sequence number or the set of sequence numbers of the active segments in the memory system may be considered to mark the application data most recently stored in the memory device, since active segments are segments whose write pages are being actively written.

The flash memory device may include higher-level logic modules that are configured for managing the synchronous mirroring operations. For example, the active and the passive servers may include a higher-level software driver that manages data mirroring between the two ends, and partial synchronization of the data when one of the servers recovers from a failure mode. The higher-level software driver may interact with the flash management layer for managing the synchronous mirroring operations.

At certain times, the higher-level software driver query the flash management modules for information on the active segments. The trigger for the query may be time-based, for example, the query may be made periodically. Alternatively, the trigger for the query may be based on the amount of physical memory that has been written. For example, a query may be a based on a threshold number of segments that are written since the last query.

Based on the query from the higher-level software driver, the flash management layer determines the sequence number of the most-recently written segments and the memory blocks within the segments at the point in time, for example, time T1. The flash management layer sends the information to the higher-level software driver. After more time has elapsed, new writes came into the system and got stored in regions of the flash memory. At time T2, the flash management layer gets a new query from the higher-level software driver and accordingly sends the information on the most-recently written segments/memory blocks within the segments at time T2.

By examining the sequence numbers corresponding to the two different points in time, the higher-level software driver can determine the segments and memory blocks that were not written at T1 but written at T2 and, specifically, which write pages include the write operations performed in the time interval T2-T1.

For instance, at time T1 a flash memory device had one active segment with the sequence number was 37, which is sent to the higher-level software driver. At time T2, the sequence number of the active segment is 42. By reading the sequence numbers corresponding to T2 and T1, the higher-level software driver can determine that segments 37, 38, 39, 40, and 41 have been completely written during the time interval T2-T1, and segment 42 is partially written. The flash management can determine the physical locations in the flash memory dice where the segments 37, 38, 39, 40 and 41 reside, since only the memory blocks included in the segments 37, 38, 39, 40 and 41 may have changed in the period T2-T1.

Therefore, by keeping track of sequence numbers associated with active segments, the flash management layer and the higher-level software driver may obtain information that is same as the information provided by the combination of a disaster recovery log and the un-committed write log, since the sequence numbers identify the flash memory blocks that may have been modified during a given time interval.

Methods, systems and devices are described in the following sections for synchronous mirroring in flash memory devices using sequence numbers associated with flash segments. For the purposes of this discussion, the terms "flash memory die," "flash memory chip" and "flash memory" are used synonymously. The terms "active server," "local storage element" and "local end" are used synonymously. Similarly, the terms "passive server," "remote storage element" and "remote end" are used synonymously. In addition, though the remaining sections are described in reference to flash memory devices, the techniques described here may be equally applicable to other forms of memory devices with aspects of asymmetric behavior. For example, phase change memory devices may be configured to employ these operations.

FIG. 1 illustrates an example of a system 100 that uses flash memory for storing data. The system 100 may implement techniques for synchronous mirroring of data to flash memory devices using sequence numbers associated with flash segments.

The system 100 includes one or more computer subsystems 102 that are interconnected by a network 104. A computer subsystem 102 includes one or more servers such as 106A, 106B and 106C through 106N.

Each computer subsystem 102 may be a server rack that hosts an array of servers, such as 106A, 106B, 106C and 106N. This may be the case, for example, when the system 100 is a server farm or a back end processing center for an enterprise. The computer subsystems may be co-located at one physical location, such as in a data center, or they may be geographically distributed.

The computer subsystems 102 communicate with each other and with remote computers via the network 104, which may include a circuit-switched data network, a packet-switched data network, or any other network able to carry data, such as Internet Protocol (IP)-based or asynchronous transfer mode (ATM)-based networks, including wired or wireless networks. The network 104 may be a Local Area Network (LAN) or a Wide Area Network (WAN). The network 104 may include the Internet, analog or digital wired and wireless networks (such as IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet and/or any other delivery or tunneling mechanism for carrying data, or any appropriate combination of such networks. In addition, the network 104 may be configured to handle secure traffic such as secure hypertext transfer protocol traffic (HTTPS) or virtual private networks (VPN) such that the connections between the computer subsystems 102 may be secure connections, such as using VPN or HTTPS. However, in other implementations, the connections may be unsecured connections.

Each server 106A, 106B, 106C or 106N is a computing device that includes memory modules for storing data, such as hard drives and flash memory. The flash memory may be in the form of memory cards on which multiple flash memory chips are affixed. A flash memory card may be organized into multiple memory packages or die packages, also referred simply as packages. A package is a multi-chip module that includes flash memory dice. Each flash memory die may be composed of flash planes that include constituent blocks of memory cells where data are stored. In some implementations, a die with two planes has two distinct sub-regions, each sub-region with its own memory array and interface circuitry. The die has a demultiplexing structure that sends commands to one plane or the other (or in some cases, to both planes). The memory cells may be single-level cells (SLCs), which store a binary digit (bit) corresponding to the value of the data that is stored in the particular memory cell. Alternatively, a memory cell may be a multi-level cell (MLC), which are configured to store several bits corresponding to the value of the data stored in the logical write page locations associated with the particular memory cell.

Each server may include multiple instances (for example, up to 16 to 24) of such flash memory cards that are connected to a motherboard in the server, yielding total flash memory capacity that may vary in range from 0.5 terabyte (TB) for a smaller memory card or system to around 100 TB capacity for a larger memory card. From the perspective of a flash memory card, the server in which the memory card is included may be considered as the host system for the memory card. Therefore, based on the above exemplary figures, the total capacity of the host system may range from 0.5 TB to 100 TB, multiplied by the number of cards in the system.

In some implementations, some of the servers 106A, 106B, 106C or 106N may be configured as active servers or as passive servers for a synchronous mirroring set up. For example, server 106A may be an active server that is connected, via the network 104, to a passive server at a remote computer subsystem 102, or to several passive servers at one or more remote computer subsystems 102. As another example, server 106A may be an active server that is connected to server 106C as a passive server in the same subsystem 102, or to several servers, such as 106B and 106C, as passive servers.

As mentioned previously, flash memory is a form of NVRAM, which is a type of random-access memory that retains its information when power is turned off (hence, non-volatile). This is in contrast to DRAM and static random-access memory (SRAM), which both maintain data only for as long as power is applied. NVRAM has asymmetric properties, in which the constituent operations, such as memory reads, writes, or erases, differ from each other by one or more orders of magnitude. For example, memory reads are performed within the same order of magnitude as the operations are performed in DRAM, memory write operations are performed much slower in comparison, and erase operations have even bigger limitations. Furthermore, certain types of NVRAM modules may have a limited number of writes. This may be the case, for example, due to the physical characteristics present in some types of NVRAM information storage mechanisms, which allow each NVRAM physical cell to be programmed and/or erased a limited number of times. Different types of NVRAM may have different analog properties (the underlying "noisy media" characteristics) depending on the underlying physical mechanism and density of the memory cell.

Each server also includes processors for processing data stored in the memory modules. In some implementations, the processors are present in the host system, for example, in the motherboard in the server to which the memory cards are coupled. In such implementations, the management of the flash memory may be performed by the host system. In some other implementations, one or more processors may be embedded in the flash memory cards. In such implementations, the management of the flash memory may be performed by the processors embedded in the memory card itself, or by some suitable combination of the processors embedded in the memory card and the processors in the host system.

The processors may be configured to execute instructions that are stored in the flash memory or elsewhere, such as in read-only memory (ROM). The instructions may include instructions for processing the data, for performing data striping at the granularity of sub-sections of flash memory chips, for recovering data stripes with degraded memory sections by dynamically re-striping the sections of flash memory chips that include degraded regions.

Each server also may include DRAM for temporary storage of data during processing operations. In addition, each server includes network interfaces for communicating with other servers on the same computer subsystem 102 or in other computer subsystems or remote computers.

Figure 2A:
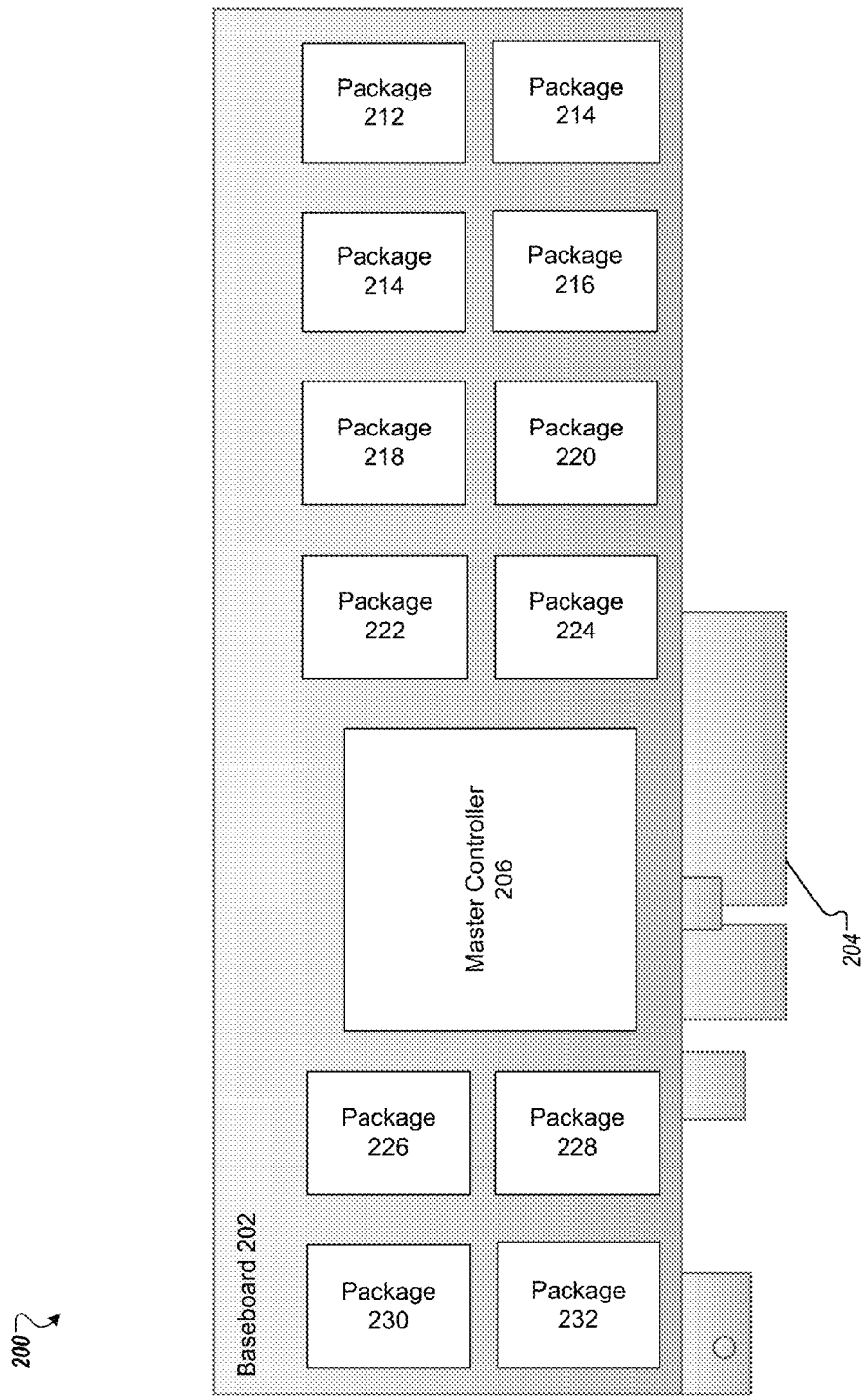
FIGS. 2A-2B illustrate an example of a memory device that includes flash memory dice.
Figure 2B:
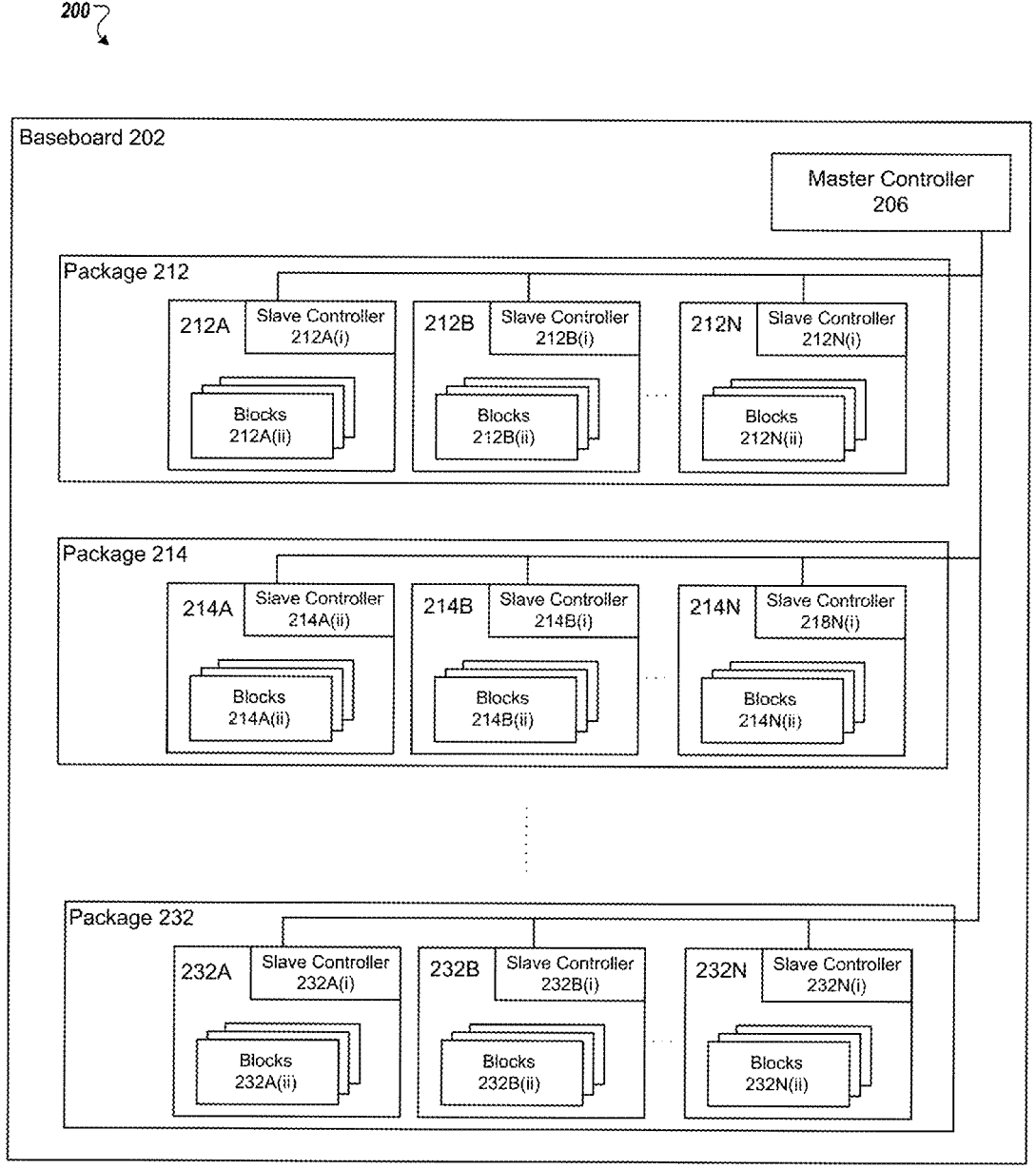

FIGS. 2A-2B illustrate an example of a memory device 200 that includes flash memory dice. The memory device 200 may be included, for example, in a server in the system 100, such as one of servers 106A, 106B, 106C and 106N. However, the memory device 200 also may be included in other systems.

FIG. 2A shows a schematic of the memory device 200 viewed from one side. As shown, the memory device 200, which is a memory card, includes a baseboard 202 with a host edge connector 204. A master controller 206 is mounted on the baseboard 202. Also mounted on the baseboard 202 are one or more memory packages, such as packages 212-232.

The baseboard 202 is a printed circuit board (PCB) that includes one or more layers of printed circuit board traces for interconnecting the various components of the memory card 200, including the master controller 206 and the different packages 212-232. The baseboard 202 may be of a form factor that allows the memory card 200 to be included within the chassis of a server, such as 106A, 106B, 106C or 106N. In some implementations, the baseboard 202 may be configured to support a daughter board, which may be used to expand the memory capacity of the memory card 200. For example, the baseboard 202 may include sockets to which a daughter board may be coupled. The daughter board may include a number of memory packages that are similar to the packages 212-232, thereby increasing the total memory capacity of the memory card 200.

The host edge connector 204 is adapted to couple to sockets mounted to a motherboard of the host system. For example, the connector 204 may couple the memory card 200 to the motherboard included in any of the servers 106A, 106B, 106C or 106N. The connector 204 is a computer data bus connector that is configured for transferring data between the memory card 200 and the host system. For example, the connector 204 may be a Peripheral Component Interconnect (PCI) bus, a PCI-eXtended (PCI-X) bus, a PCI Express (PCIe) computer expansion bus, or some other suitable connector.

The master controller 206 is a processing device that is configured for managing the storage and retrieval of data in the flash memory chips included in the memory card 200. In some implementations, the memory card 200 includes multiple master controllers 206. In some implementations, the master controller 206 manages one or more slave controllers that are included in the packages 212-232 and coupled to the master controller 206 by a plurality of master-slave memory bus channels. In some other implementations, the slave controllers are included in the same logical unit (such as a package) as the master controller, while retaining the logical differences between the master and slave controllers. In yet other implementations, the master controller 206 manages one or more slave controllers that are external to the packages 212-232. For example, the slave controllers may be placed between the master controller(s) and the flash memory dice. The master controller(s) communicate with the slave controllers through master-slave memory bus channels. Each slave controller in turn communicates with a subset of the flash memory dice, using, for example, a separate channel controller to control each die.

A host bus channel formed of traces of the baseboard 202 may couple the master controller 206 to the host edge connector 204 for communicating with the host system. The one or more slave controllers are adapted to provide transparent access to the flash memory included in the packages. The master controller 206 and the slave controllers provide native access of the flash memory to the processors in the host system.

Each of the packages 212-232 includes a rectangular printed circuit board on which is mounted a plurality of packaged flash memory chips. The flash memory chips may include NAND flash memory die, NOR flash memory die, or any other suitable non-volatile memory. In some implementations, each of the packages 212-232 may have different types of flash memory that can be identified to the memory card 200 so that read operations, write operations, and/or erase or maintenance operations can be tailored to the given type of memory.

In some implementations, each package includes 8 NAND flash memory dice, which are arranged in 4 pairings based on electrical wiring and pin outs that come out of the package, among other parameters. The two dice in a pair may be referred to as siblings of each other. The package is configured such that for each pair, one of the dice may be active for performing input/output (I/O) operations at a time, even though both dice may be considered active from a flash operation point of view. Therefore, in a package, 4 of the dice may perform input/output (I/O) operations concurrently, but all 8 dice may be active for performing flash operations.

In the above implementations, in addition to the 12 packages 212-232 that are shown, the memory card 200 includes 12 more packages mounted on the reverse side of the baseboard 202, yielding a total of 24 packages mounted on the baseboard 202. In addition, the memory card 200 includes the daughter board, with 24 packages mounted on the daughter board. Therefore, in such implementations, the total number of packages in the memory card 200 is 48. For 8 dice per package, the above configuration yields a total of 384 flash memory dice in the memory card 200.

In alternative implementations, the number of packages 212-232 may be other than 12, for example, some tens of packages, and the memory card 200 may include additional tens of packages mounted on the reverse side of the baseboard 202, yielding a total number of packages per board that is a number other than 24. With multiple boards per card, such as one or more daughter boards, the total number of packages in the memory card may be in the tens or hundreds, leading to multiple hundreds or thousands of dice.

In addition to the features shown in FIG. 2A, the memory card 200 may include one or more embedded processors, ROM, DRAM and additional NVRAM that are mounted to the baseboard 202. The ROM may be configured to store boot instructions for the memory card 200. The DRAM may be configured to provide scratch pad memory to the embedded processors and store translation structures (for example, a translation table mapping logical addresses to physical addresses) to access data in the flash memory chips. The NVRAM may include firmware instructions for the memory card 200 that may be periodically upgraded. The firmware instructions drive and control the master controller 206 and the and slave memory controllers to perform read, write, erase or maintenance operations to access data with the flash memory chips of the packages 212-232. The embedded processors execute the firmware instructions to drive and control the master and slave memory controllers to access data as well as read, write, and maintain the translation structures in the DRAM.

The embedded processors may be further coupled to the master memory controller 206 and the edge connector 204 to communicate with each. The embedded processors also may be in communication with the host processors in the host system over the edge connector 204 to receive read and write operation requests from the host application or host operating system software to access data in the flash memory dice in the memory card 200.

As described previously, each memory card 200 may have two types of logical controllers, namely, the master controller, which handles host-level interactions, and slave controller(s), which handles flash-level interactions. The master controller and the slave controller(s) may communicate using standard protocols, or a proprietary hardware interface, or any suitable combination of both. In some implementations, this interface is implemented using pins on the physical devices and traces on the baseboard. In other implementations in which master controller and slave controller(s) are in the same physical device, the interface may be implemented using internal device logic on the physical device.

In some implementations, a memory card 200 may utilize two physical devices—each of which implements one master controller and several slave controllers. One of the master controllers may be on the "baseboard" on the PCI expansion slot on the mother board of the computing device, and the other master controller may be on the "daughter board" located on an expansion slot on the baseboard. Communication between the host and the daughter board's master controller may be routed through the baseboard's master controller. In such implementations, communication between the two master controllers may be through the standard interface of PCIe. A proprietary hardware interface also may be feasible.

The master controller(s) and slave controller(s) coordinate their respective actions to implement the data path of the flash memory system. In this context, the data path, which also may be referred to as the data plane, indicates that that the master and slave controllers do not themselves determine which flash memory locations are involved in the memory operations. Instead, the determination is made by the control path or control plane of the system. The master and slave controllers receive commands from the "control path" to perform flash-level operations and carry out such operations against specified host DRAM resources.

The control path of the system may be implemented by the driver software, which may be implemented as firmware instructions executed by the host processor or embedded processors associated with the controllers. In some implementations, there may be a single driver per card, while in other implementations; there may be several drivers per memory card. The driver software instructions may enable each slave controller to communicate independently with the master controller(s).

In some implementations, the driver software runs on the host computing device as a device driver. The device driver communicates with the master controller(s) on the memory card using standard PCIe commands—in standard terminology, the latter may be referred to as "memory mapped I/O" (MMIO) instructions (they are load/store instructions at the processor level, except that they get routed to the appropriate device instead of DRAM). The driver in turn receives requests from host central processing unit (CPU) applications and operating system (for example, the file system component) using standard host-based application programming interfaces (APIs) and mechanisms (for example, a system call).

In some other implementations, the driver software runs on an embedded processor coupled with the baseboard master controller. In these implementations, the term "firmware" is usually used to denote the driver software. In still other implementations, the driver functionality may run in a split/parallel fashion across more than one embedded processor associated with one or more master controllers. In cases where the firmware runs on one or more embedded processors, the applications/operating system requests get communicated to the firmware using the same PCIe memory mapped I/O instructions, using an intermediate (separate, minimal) software driver, for example, installed on the host computing device.

As described previously, the combination of the master controller, the slave controller(s) and the driver software may be referred to as the flash translation layer or the flash management layer. The flash management layer manages the flash memory dice, for example, mapping logical memory blocks to physical locations in the flash memory dice using the flash translation table. The flash management layer also interfaces the flash memory dice with higher level applications, such as the synchronous mirroring modules, and the operating system.

FIG. 2B illustrates a schematic of the memory card 200 showing the flash memory dice included in the packages 212, 214 and 232, which are a subset of the packages 212-232. Package 212 includes flash memory dice 212A . . . 212N, package 214 includes flash memory dice 214A . . . 214N and package 232 includes flash memory dice 232A . . . 232N. Each of the dice 212A . . . 212N includes a slave controller, such as 212A(i)-212N(i) and memory blocks 212A(ii)-212N(ii) respectively. Each of the dice 214A . . . 214N includes a slave controller, such as 214A(i)-214N(i) respectively, along with memory blocks 214A(ii)-214N(ii) respectively. Similarly, each of the dice 232A . . . 232N includes a slave controller 232A(i)-232N(i) respectively and memory blocks 232A(ii)-232N(ii) respectively.

Although FIG. 2B shows the slave controllers 212A(i)-212N(i), 214A(i)-214N(i) and 232A(i)-232N(i) are mounted to the packages 212-232 and coupled between the master controller 206 and the plurality of flash memory dice, in some other implementations, the slave controllers 212A(i)-212N(i), 214A(i)-214N(i) and 232A(i)-232N(i) are mounted to the baseboard 202 and coupled between the master controller 206 and the respective flash memory dice in the packages 212-232. In yet other implementations, the slave controllers 212A(i)-212N(i), 214A(i)-214N(i) and 232A(i)-232N(i) are mounted together in an integrated circuit package with the master controller 206 and coupled between the master controller 206 and the respective flash memory dice in the packages 212-232.

Each slave controller is configured for providing transparent access to its respective die. As described previously, all the slave controllers are connected to the master controller 206 by a plurality of master-slave memory bus channels, which may be implemented as PCB traces on the baseboard 202. The master controller 206 natively controls the flash memory dice to obtain predictable bandwidth and latency performance with the flash memory dice included in the packages 212-232. All operations that take place on the flash memory dice 212A . . . 212N, 214A . . . 214N or 232A . . . 232N (for example, read, write, erase, control operations such as reset, etc.) are completely visible to (and under the control of) the master controller 206. The flash memory interface of active dice of the dice in a package is passed through the respective slave memory controller to the master controller 206. For example, the flash memory interface of the die 212A is passed through the slave controller 212A(i) to the master controller 206.

The master controller 206 is able to exercise directly each of the operations that are supported by the flash memory dice 212A . . . 212N, 214A . . . 214N or 232A . . . 232N. The slave controllers may perform protocol conversion, but do not drop/intercept (without involving the associated flash memory die) a request from the master controller. However, the slave controllers do not autonomously initiate any flash memory operation.

Each slave controller 212A(i)-212N(i), 214A(i)-214N(i) and 232A(i)-232N(i) is configured to arbitrate memory bus channels shared by the multiple flash memory dice 212A . . . 212N, 214A . . . 214N and 232A . . . 232N respectively. Each slave controller can buffer and multiplex signals between the master controller 206 and the multiple flash memory dice. In addition, each slave controller can combine a sequence of predictable non-volatile memory operations together into a compound operation to improve control bandwidth with the flash memory dice.

The granularity at which the data in the flash memory dice 212A . . . 212N, 214A . . . 214N and 232A . . . 232N is accessed may be referred to as memory blocks or memory pages. For example, the flash memory die 212A includes multiple memory blocks that are indicated collectively by 212A(ii) in FIG. 2B. The size of a memory block may vary based on the type of flash memory that is used. For example, the size of a memory block may be different for NAND flash dice and NOR flash dice. Among NAND flash devices, the sizes may be different between SLC and MLC types of NAND flash. NAND flash from different process generations also may have different sizes (for example, 34 nm NAND flash versus 25 nm NAND flash). In addition, the size of a memory block may vary based on the type of operation that is performed on the flash memory device. For example, for a NAND flash memory device, data may be written to the memory device in units of write pages. The size of a write page may be small, in the order of a small number of kilobytes (e.g., in the range 4 KB-16 KB).

In some implementations, data may be erased from the NAND flash device in units of erase blocks, which are typically larger in size than the write pages (in the order of several megabytes) and one erase block may include multiple write pages. Once data is written to a write page, the entire erase block associated with the write page has to be erased before new data can be written to the write page. In some other implementations, data may be erased in units of flash segments as described previously. A flash segment is a logical construct mapping to a physical region of a flash memory card 200 that is composed of multiple erase blocks distributed across the flash memory dice in a RAID stripe.

Figure 3:
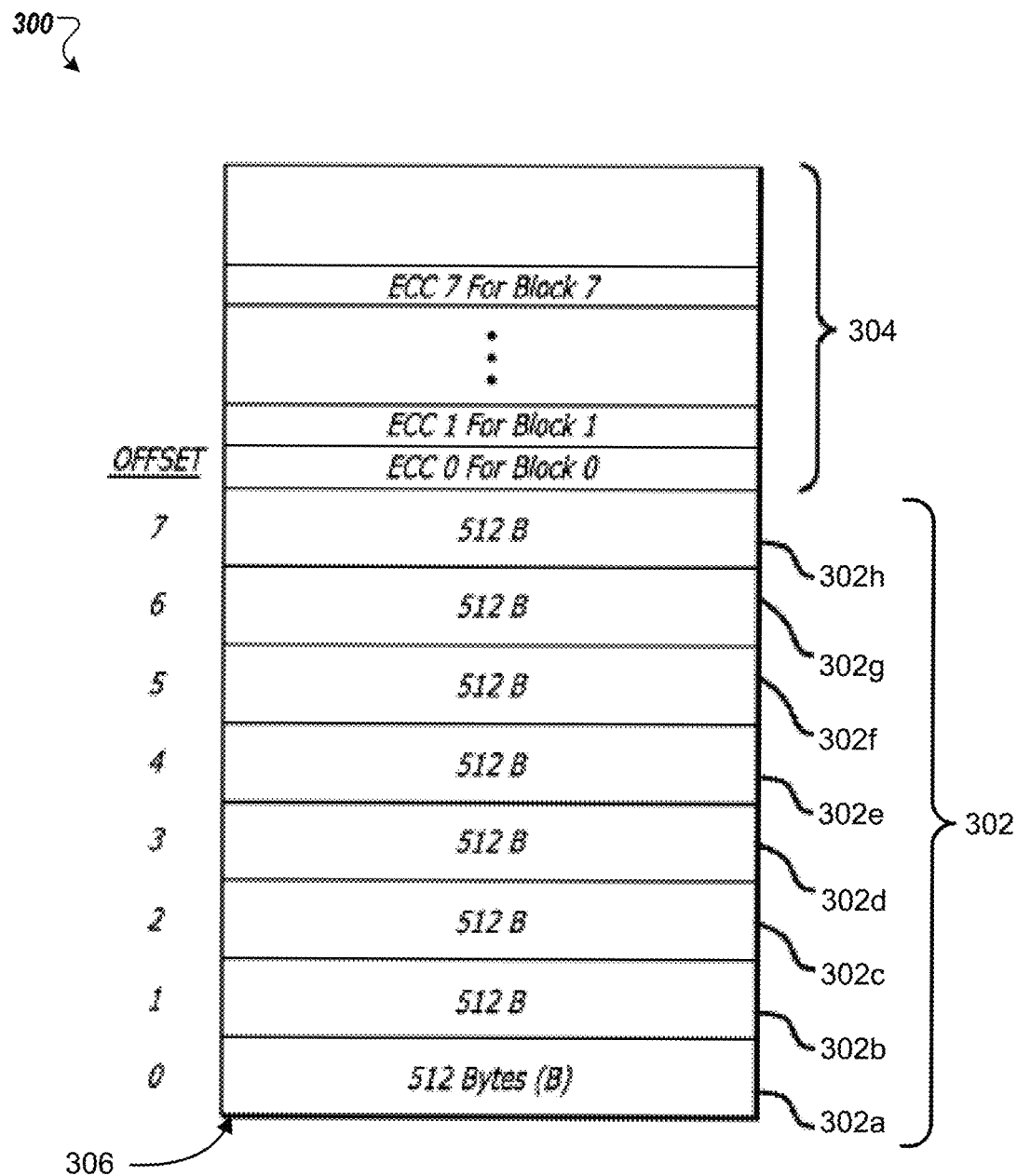
FIG. 3 illustrates an example of a memory page that is stored in a flash memory die.

FIG. 3 illustrates an example of a memory page 300 that is stored in a flash memory die. The flash memory chip may be one of 212A . . . 212N, 214A . . . 214N and 232A . . . 232N that are packaged in the memory card 200. However, the flash memory chip also may be implemented in other memory cards or systems.

The memory page 300 includes a data portion 302 and an error correction code (ECC) portion 304. The data portion 302 includes memory units 302a-302h in which data is stored. The memory page has a page starting address indicated by 306.

The size of the data portion may vary depending on the particular NVRAM design and configuration. In the example shown, the data portion 302 has a size of 4 KB. Other sizes for the data portion may be used (for example, 8 KB or 16 KB).

As shown in FIG. 3, the memory page 300 has an offset address indicated by zero through seven from the page starting address 306, which allows each of the memory units 302a-302h to be 512 bytes in size. In some implementations, each of the memory units 302a-302h may correspond to a write page, while the data portion 302 may correspond to an erase block. Therefore, in such implementations, the erase block 302 includes the write pages 302a-302h.

The size of the ECC varies with the underlying NVRAM implementation. For the configuration where the data portion 302 is 4 KB, the ECC portion 304 is 128 bytes. In other implementations, the size of the ECC portion may be higher (such as in the range of 500 bytes) to meet the higher media error rates of data portions of larger size (for example, for more current generations of flash devices such as MLC type memory).

The ECC portion 304 is used to store ECC data that is used for error correction of data stored in 302a-302h. An error correction code may be generated for each 512 byte unit 302a-302h. Program write errors or flash read errors may be detected using the error correction code. While ECC is useful to correct an a priori anticipated threshold of bit errors, redundant data storage may be used to recover data when the number of bit errors exceeds the a priori threshold or due to a complete failure of a storage device, such as the flash memory die in which the memory page 300 is included.

In some implementations, data may be stored in one or more 512 byte regions across a memory page with one or more consecutive offset addresses respectively. The region in which data is stored may be referred to as a chunk of memory. For example, employing a single offset address allows a 512 byte chunk of data to be stored across one of the units 302a-302h of the memory page 300. A RAID group in this case may be consistently written with regions of 512 byte chunks of data. This may be the case, for example, with 7 data stripes and 1 parity stripe spread across 8 flash memory dice that implement 4 KB memory pages, such as the page 300. In this configuration, each die sees a 512 byte region for each stripe within the same memory page.

In some other implementations, a pair of offset addresses (for example, offset addresses 6 and 7) may be used to allow 1 KB chunks of data to be stored in regions of the memory page 300. A RAID group in this case may be consistently written with regions of 1 KB chunks of data. This may be the case with three data stripes and one parity stripe spread across four flash memory devices with 4 KB memory pages, such as the memory page 300. In this configuration, each die sees a 1 KB region for each stripe within the same memory page.

In some implementations, a software driver or embedded firmware operating on the host system may accumulate data, calculate parity, and store the data and parity information as stripes across the flash memory dice. The parity calculations may be performed by the host processors, for example, based on instructions of the host software driver or embedded firmware. In other implementations, the software driver operating on the memory card 200 may accumulate the data and initiate a command to the master controller 206. The master controller 206 can then be responsible for computing the parity information and storing the data and parity stripes across the flash memory dice.

The memory card 200 may include several such RAID groups. For example, referring to the implementation of the memory card 200 with 48 packages with 8 dice per package, the memory card 200 may include 24 RAID groups, with 16 dice in 2 packages in each group.

Figure 4:
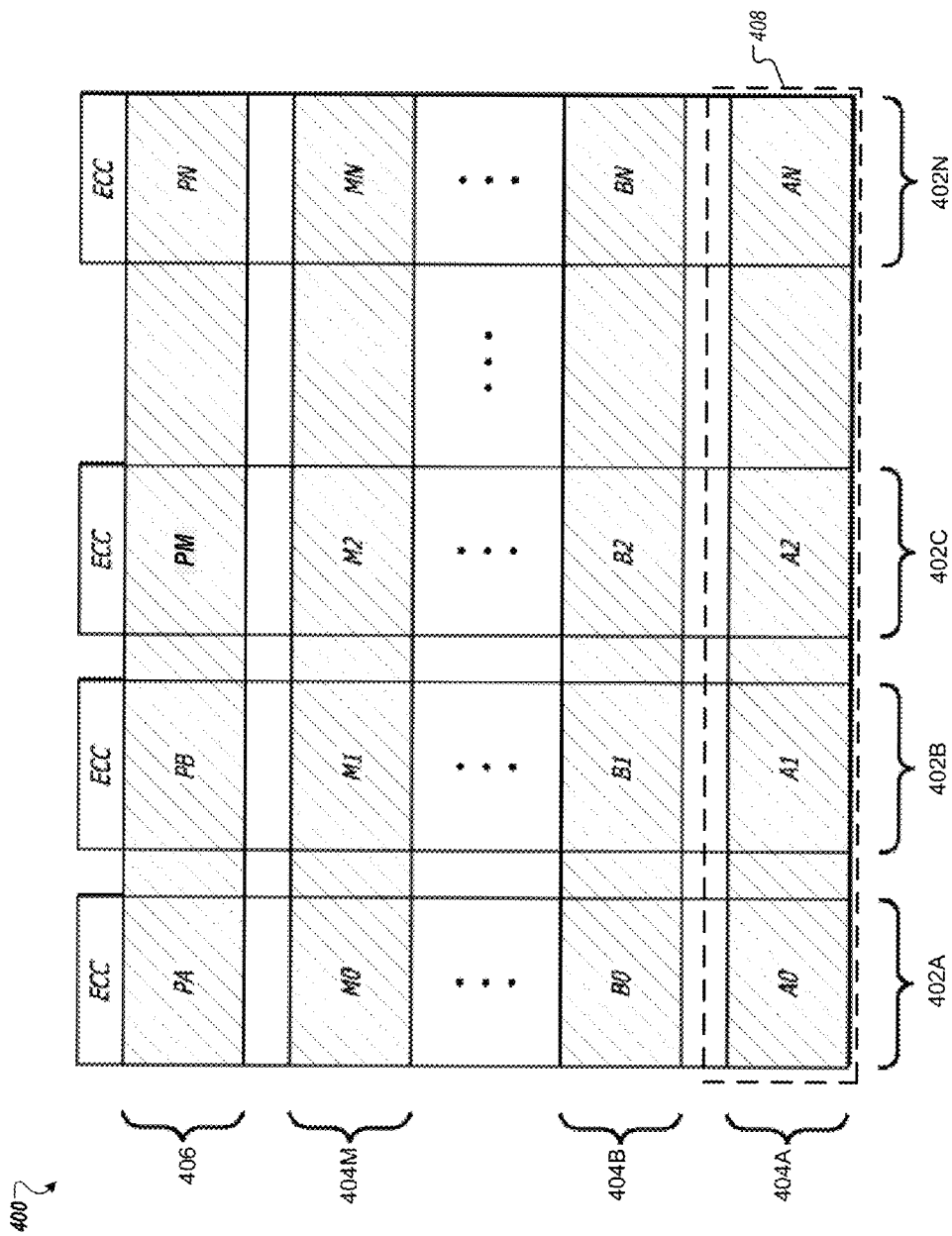
FIG. 4 illustrates an example of a group of flash memory dice storing data redundantly in data stripes distributed across the group of flash memory dice.

FIG. 4 illustrates an example of a group 400 of flash memory dice storing data redundantly in data stripes distributed across the group of flash memory dice. The flash memory dice may be mounted on the memory card 200. For example, the flash memory dice may be 212A . . . 212N, 214A . . . 214N and 232A . . . 232N that are packaged in the memory card 200. Accordingly, the following sections describe the group 400 of flash memory dice as implemented by the card 200 in the system 100. However, the group 400 of flash memory dice also may be implemented by other memory cards and systems.

The group 400 illustrates one implementation of a RAID-aware flash memory layout. The group 400 includes N flash memory dice 402A, 402B, and 402C through 402N, collectively referred as 402A . . . 402N. Pages of data are stored across the flash memory dice 402A . . . 402N in M data stripes 404A and 404B through 404M, collectively referred as 404A . . . 404M. Each stripe includes N data chunks, such as A0 . . . AN for data stripe 404A, B0 . . . BN for data stripe 404B and M0 . . . MN for data stripe 404M. A parity stripe 406 is also stored across the flash memory dice 402A . . . 402N. The parity stripe is formed of parity chunks PA-PM and a single meta-data parity chunk PN. One or more of the data chunks in a RAID stripe are aggregated together to form a flash segment, such as segment 408.

It is to be noted that various configurations may be used other than the configuration shown. For example, different encoding of the parity stripe may be used that group the parity information across multiple data stripes. Similarly, the parity information may be stored as part of the individual data stripes instead of being stored in a separate parity-only stripe.

The flash memory dice 402A . . . 402N may be same as the flash memory dice 212A . . . 212N, or 214A . . . 214N, or 232A . . . 232N. The size of each data chunk may depend on the number of flash memory dice that are used, and the number of data stripes. Each data chunk may have a size same as a write page, or an erase block, or some other suitable size unit of memory.

For each data stripe, a corresponding parity chunk is generated by computing parity of the data chunks included in the data stripe that are stored in the flash memory dice. For example, PA is the parity chunk for the data stripe 404A; therefore, PA may be computed based on the data chunks A0 . . . AN. The meta-data parity chunk PN is parity computed from the plurality of parity chunks previously generated. Therefore, PN is computed based on the parity chunks PA . . . PN.

In some implementations, the parity chunks and the meta-data parity chunk in the parity stripe are selectively stored on different flash memory die so that data can be recovered in response to a failure, removal, and replacement of a flash memory die. Each data chunk in a stripe is also stored in a different flash memory die so that data can be recovered in response to a failure, removal, and replacement of a flash memory die. For example, for the data stripe A, the data chunk A0 is stored in the flash memory die 402A, data chunk A1 is stored in the flash memory die 40B, data chunk A2 is stored in the flash memory die 402C, and the data chunk AN is stored in the flash memory die 402N.

The parity chunks and the meta-parity chunk can be stored arbitrarily across the flash memory dice 402A . . . 402N provided their locations are known. For example, as shown, the PA chunk in the parity stripe 406 is stored in the flash memory die 402A, the PB parity chunk is stored in the flash memory die 402B, the PC parity chunk is stored in the flash memory die 402C, and the meta-parity chunk PN of the parity stripe 406 is stored in the flash memory die 402N. In another implementation, the meta-parity chunk PN may be stored in the flash memory die 402A, the PA parity chunk may be stored in the flash memory die 402B, the PB parity chunk may be stored in the flash memory die 402C, and the PC parity chunk may be stored in the flash memory die 402N.

As shown, M data stripes and one parity stripe are written across N flash memory dice 402A through 402N for each flash write page. The data and parity are striped across multiple write pages, erase blocks or some other suitable memory unit in the different flash memory dice. The data stripes and parity stripes are written to different offsets within one or a couple of flash write pages, erase blocks or some other suitable memory unit, for each constituent flash memory die. The parity chunk PA is a result of determining the parity of the data stripe 404A. The parity chunk PB is a result of determining the parity of the data stripe 404B. The parity chunk PM is a result of determining the parity of the data stripe 404M. PN represents the parity meta-data chunk stored in a flash memory die 402N with its value being the parity of the parity data chunks PA through PM.

The system may be configured to be responsive to the relative size of "data chunk" sizes and the use of a particular data chunk size relative to the impact on the system. A data chunk may have a size equivalent to an erase block, or some other suitable unit of size associated with the memory. For example, each of A0 . . . AN may correspond to an erase block in the respective flash memory die 402A . . . 402N. In such cases, data associated with the stripe 404A may be written to the erase blocks A0 through AN in the flash memory dice 402A through 402N, respectively.

As described above, in striping, the data may be redundantly stored in different flash memory dice at the granularity of erase blocks, or some other suitable unit of size associated with the memory. For example, data that is striped in 404A in data chunks of size equivalent to erase blocks may be replicated in a different group of flash memory dice. In some implementations, the data may be redundantly stored using parity encoding, such as XOR encoding, as described previously. In some other implementations, the data may be replicated using mirroring, while in some other implementations, the data may be redundantly stored using some suitable combination of parity encoding and mirroring, and/or some other appropriate mechanisms.

In one configuration, the data chunks for a data stripe may be written to 8 flash memory dice. Referring to the example of a flash memory die package with 8 dice arranged in 4 pairings with one die of each pair active at a given time for I/O operations, the above configuration may include the 4 active (considered from an I/O operations perspective) dice from one package, such as 212, and 4 active dice from another package, such as 214. The data chunks written to the 4 active dice in a package may be replicated in the other 4 sibling dice in the respective package. In this manner, the data may be striped and replicated to provide RAID-like reliability. In some implementations, depending on factors such as the configuration of the slave controller and channels relative to the number of memory dice, other configurations may be used. For example, the data chunks may be striped across 8 different dice in 8 different packages along with parity encoding to provide the ability to reconstruct the data chunks in the event of the loss of any single die or package.

The group of flash memory dice that are involved in storing and replicating data in the above manner constitute a RAID group. As indicated previously, the RAID group, also referred to simply as a RAID, provides data reliability to the data stored in the flash memory dice 402A . . . 402N. In the present context, a RAID group is associated with a collection of erase blocks that are aligned at the same memory address offset for each flash memory die in the RAID group. In the above example, the RAID group constitutes 16 flash memory dice across 2 packages. The RAID group has a "width" of 8, that is, data chunks in a data stripe are stored across 8 flash memory dice and replicated in 8 other flash memory dice.

The segment 408 includes one or more erase blocks in each flash memory die in the RAID group. For example, each of the data chunks A0 . . . AN may be an erase block as discussed previously. The segment 408 may be composed of the erase blocks A0 . . . AN, as shown. In an alternative configuration, the segment 408 may be composed of two erase blocks per flash memory die, such as A0 and B0 in die 402A, A1 and B1 in die 402B, and so on. Data is written to the flash memory dice 402A . . . 402N sequentially in the order of segments. Data is written to a segment at the granularity of the write pages included in the erase blocks within the segment. Therefore, the write pages corresponding to the erase blocks in the segment 408 are filled up first before writing the to the write pages corresponding to the erase blocks in the next higher segment.

While writing the data to the segments, the flash management layer keeps track of the active segment, that is, the segment currently written. In some implementations, the flash management layer also keeps track of the write page and/or erase block within the active segment that is currently written.

A higher-level software driver, which is configured for managing the synchronous mirroring operation with a passive server, queries the flash management layer at specific points in time for information on the active segments. Upon receiving the query, the flash management layer determines the sequence number of the segment that is most-recently filled, and the number of the memory block within the segment that is most recently written to. The flash management layer sends the information to the higher-level software driver. The higher-level software driver in turn forwards the sequence number of the segment and the memory block within the segment to the passive server, which stores the information in a "marker," which is a data structure that is maintained by the higher-level software driver at the passive server. In some implementations, the active server may receive an acknowledgement from the passive server, which indicates to the active server that the remote end has received the updated information.

Figure 5:
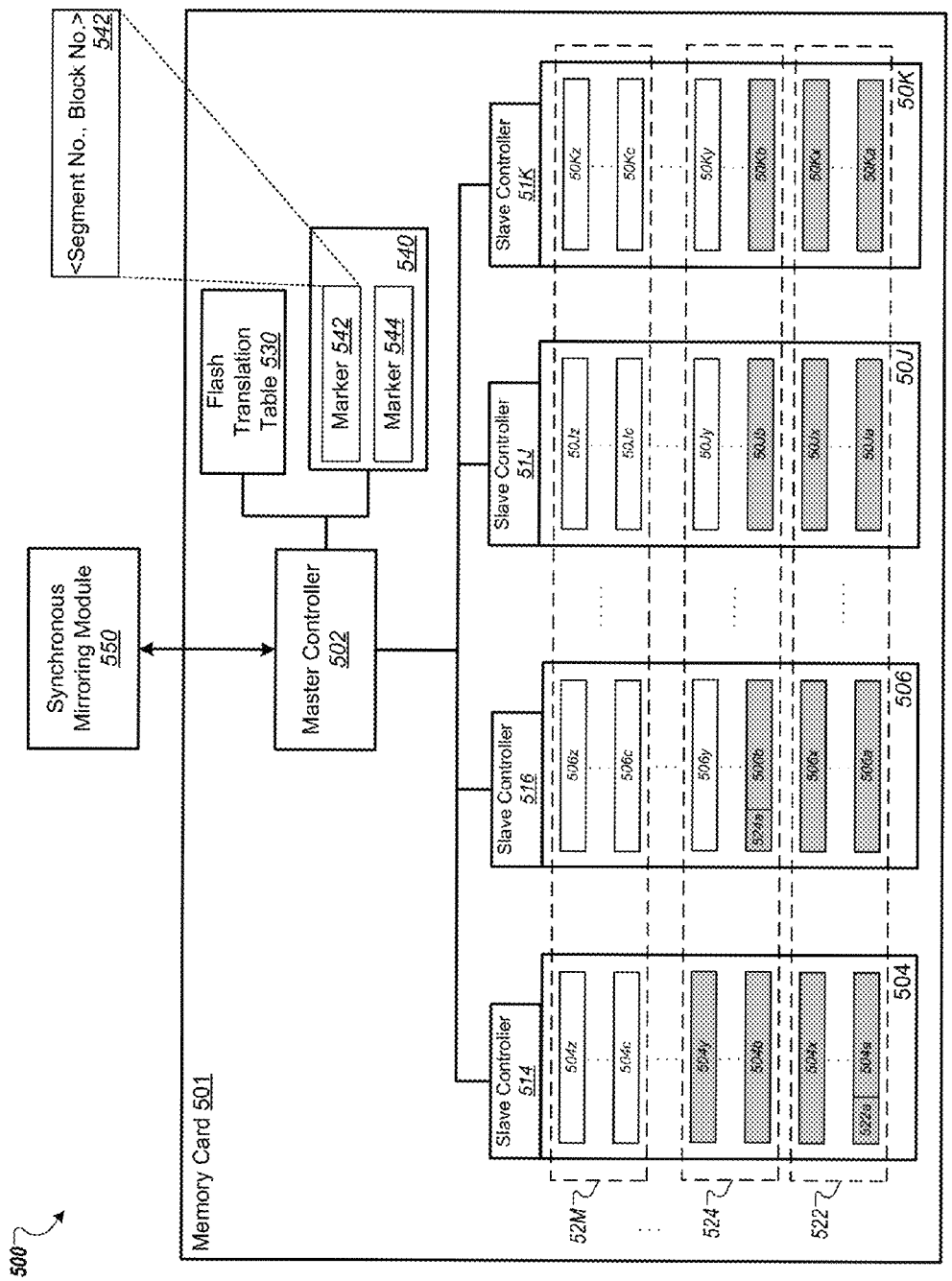
FIG. 5 illustrates an example of a memory server that performs synchronous mirroring using segment sequence numbers.

FIG. 5 illustrates an example of a memory server 500 that performs synchronous mirroring using segment sequence numbers. The memory server 500 may be either the active server or a passive server in a synchronous mirroring setup. The memory server 500 includes as the storage element the memory card 501, which may be similar to the memory card 200 included in the system 100. The memory card 501 includes a master controller 502, which manages the flash memory dice 504, 506, 50J and 50K ('J' and 'K' being integers) through the slave controllers 514, 516, 51J and 51K respectively. The flash memory die 504 includes multiple erase blocks, such as 504a, 504b, 504c, 504x, 504y and 504z. Similarly, flash memory die 506 includes multiple erase blocks, such as 506a, 506b, 506c, 506x, 506y and 506z; flash memory die 50J includes multiple erase blocks, such as 50Ja, 50Jb, 50Jc, 50Jx, 50Jy and 50Jz; and flash memory die 50K includes multiple erase blocks, such as 50Ka, 50Kb, 50Kc, 50Kx, 50Ky and 50Kz.

The flash memory dice 504, 506, 50J and 50K are part of a RAID stripe that includes segments 522, 524 and 52M, among others. The erase blocks in each flash memory die are split into different segments. For example, in flash memory die 504, erase blocks 504a and 504x are in segment 522, erase blocks 504b and 504y are in segment 524, and erase blocks 504c and 504z are in segment 52M. For each segment, the memory card 501 stores the sequence number of the segment, and the erase block within the segment that is recently written. In some implementations, the memory card 501 may store the information in the flash memory dice. For example, the segment sequence number for segment 522 may be stored as 522a in the flash memory die 504, while the segment sequence number for segment 524 may be stored as 524a in the flash memory die 506. In some other implementations, the memory card 501 may store the segment information separately from the flash memory dice, for example in an on-board RAM.

The memory card 501 includes a flash translation table 530. The flash translation table 530 maps a logical block address (LBA) to a physical block number (PBN), which indicates the physical locations in one or more flash memory dice where the data are stored. In some implementations, the translation table may be a dynamic RAM (DRAM) structure that is distinct from the flash memory dice 504 . . . 50K. However, in other implementations, the translation table may be stored in a dedicated portion of one or more flash memory dice, or in some other suitable location.

The master controller 502, the slave controllers 514, 516, 51J and 51K and the flash translation table 530 together constitute the flash management layer for the memory card 501. In implementations where the memory server 500 is a passive server in the synchronous mirroring setup, the memory card 501 stores the information on active segments, which is received from the active server, using markers, such as marker A 542 and marker B 544. The markers may be stored in a separate memory structure 540, for example, RAM. In addition, or alternatively, the markers also may be stored in the flash memory dice.

The memory server 500 includes a synchronous mirroring module 550, which is a higher-level software driver that manages the mirroring operations for the storage elements associated with the memory server 500, for example, the memory card 501. The synchronous mirroring module 550 is implemented as part of the higher level software in the memory server 500, outside the memory card 501.

Although FIG. 5 shows three segments 522, 524 and 52M, the total number of segments in the memory card 501 may be a different number that is greater than the three shown. Further, although the segments are shown as composed of portions of the flash memory dice 504, 506, 50J and 50K, the segments may include portions of other flash memory dice that are not shown. The number of erase blocks per flash memory die in a segment also may be different than the number shown. For example, in some implementations, each segment may include only one erase block per flash memory die. In some other implementations, different segments may include different number of erase blocks.

The flash memory dice 504, 506, 50J and 50K may belong to the same package, or they may belong to different packages. As described previously, in some implementations, the slave controllers 514, 516, 51J and 51K may be mounted to the packages associated with the flash memory dice 504, 506, 50J and 50K respectively and coupled between the master controller 502 and the respective flash memory dice. In some other implementations, the slave controllers 514, 516, 51J and 51K are mounted to the baseboard 501 and coupled between the master controller 502 and the flash memory dice in the associated packages. In yet other implementations, the slave controllers 514, 516, 51J and 51K are mounted together in an integrated circuit package with the master controller 502 and coupled between the master controller 502 and the flash memory dice.

As described previously, in some implementations, the flash management layer writes new data items to the flash media dice 504, 506, 50J and 50K in a manner analogous to writing a log. The flash management layer carves the total storage on each flash memory die on the memory card 501 into discrete units at the granularity of erase blocks and physically organizes collections of erase blocks in a RAID group into sequential segments. For example, for a RAID group of width 8 (that is, there are 8 flash memory dice in the RAID group) and an erase block (for example, 504a or 506a) size of 2 megabytes (MB), a segment (for example, 522 or 524) may be of size 2 erase blocks×8 wide×2 MB/erase block, that is, 32 MB. Therefore, the total storage in the memory card 501, which may be in the order of terabytes, may be organized into multiple segments, which are in the order of tens of megabytes.

When the flash management layer receives a write operation from the higher-level application or operating system, it identifies a current active segment, writes the data associated with the write operation in the next available location in the active segment, and makes an entry in the flash translation table that LBA X (for example, corresponding to a write page in the erase block 504a) has now been written to physical location Y (for example, in flash memory die 504) that corresponds to active segment Z (for example, segment 522). Therefore, the flash management layer fills segments in a log manner with the application data and fills entries in the flash translation table in a log manner. Considering three writes consecutively as Write 1 followed by Write 2 followed by Write 3, the data for Writes 1, 2 and 3 will appear in log manner in the segments, and the translation entries for the Writes 1, 2, and 3 will appear in log manner in the flash translation table.

When space is no longer available for writing new data in the physical flash memory dice that maps to the current segment, the current segment is said to fill up with data. The flash management layer marks another segment as being active and then effectively performs the same operation as described in the preceding section. In some implementations, there may be more than one active segment for efficiency reasons. The flash management layer will route a write request to one of the active segments.

When a segment is activated for storing data, the flash management layer associates a sequence number with the segment. In some implementations, the sequence number is the next higher sequence number after the segment that was written immediately prior to the currently activated segment. In some other implementations, sequence numbers are in descending order such that the sequence number associated with a segment is the next lower sequence number after the segment that was written immediately prior to the currently activated segment.

In some implementations, the sequence numbers of the segments may be recorded in the physical flash memory, associated with the corresponding segment. For example, the sequence number for segment 522 may be recorded in a portion 522a of the flash memory die 504, while the sequence number for segment 524 may be recorded in a portion 524a of the flash memory die 506. In some other implementations, the sequence numbers of the segments may be recorded in a separate memory other than the flash memory dice, such as in a RAM. Alternatively, the sequence numbers of the segments may be recorded both in the flash memory dice (for example, 522a or 524a) and in a separate RAM.

In some implementations, for the active segments, along with the sequence numbers of the segments, the flash management layer records the sequence number of the next available flash memory block (for example, write page) within the active segment in the physical flash memory dice (for example, 522a or 524a), or in a separate memory (for example, RAM), or both. The sequence numbers of the flash memory blocks within a segment may be recorded as offsets from first memory block within the segment. For example, if there are 4096 write pages within the erase blocks included in a segment, the write pages may be sequentially marked 0-4095, with 0 being the number of the first write page in the segment.

The flash management layer records information on the active segments separately so that the active segments may be tracked apart from the non-active segments. For example, the flash management layer may maintain a record in DRAM that stores the sequence numbers of the active segments. Therefore, when new segments become active, the sequence numbers that are stored in the DRAM record for the active segments are updated.

The synchronous mirroring module 550 queries the flash management layer for information on the active segments at points in time. In response to the query, the flash management layer may send the sequence number(s) of the active segment(s), and the offset(s) within the active segment(s) that denote the sequence number(s) of the next available flash memory block(s) within the active segment(s).

The synchronous mirroring module 550 forwards the sequence number(s) of the active segment(s) along with the sequence number(s) of the next available flash memory block(s) within the active segment(s) to the passive server in the synchronous mirroring setup. The passive server stores the information received from the active end in data structures called markers. For example, if the memory server 500 is a passive server, then the memory server 500 stores marker 542 that provides information on the sequence number(s) of the active segment(s) and the sequence number(s) of the next available flash memory block(s) within the active segment(s) at the active end. As shown, marker 542 includes the sequence number and block number of an active segment on the active server. There may be two active segments on the active server at a time; therefore, the marker 542 may store information on the sequence numbers of both active segments, and, for each active segment, the sequence number of the next available flash memory block within the segment.

In some implementations, the passive server may store more than one marker. For example, if the memory server 500 is a passive server, then the memory server 500 may store two markers 542 and 544 as shown. This may be useful in the two-level marker scheme, which is described in a following section. In such implementations, each of the two markers 542 and 544 provides information on the sequence number(s) of all the active segment(s) and, for each active segment, the sequence number of the next available flash memory block within the active segment at the active server corresponding to the writing phase associated with the respective marker.

The marker may be considered as metadata associated in the flash management layer. In some implementations, the markers may be stored in memory separate from the physical flash memory, such as in a RAM 540. In some other implementations, the markers may be stored in the physical flash memory, for example, as data structures in a known portion of the flash memory dice 504, 506, 50J or 50K. In other implementations, the markers may be stored both in the physical flash memory and in a separate memory such as a RAM.

The markers 542 and/or 544 are periodically updated on the passive server when the synchronous mirroring module on the active server sends updated information regarding the active segments on the active server. In some implementations, the markers are managed by the synchronous mirroring module on the passive server, while in some other implementations, the markers are managed by the flash management layer on the passive server. In other implementations, the markers are managed by a suitable combination of the synchronous mirroring module and the flash management layer on the passive server.

A marker is equivalent to recording a position in a logical log. Given two positions in the logical log, the entries that were written in the log between those two positions can be determined. Therefore, given two markers, the synchronous mirroring module can identify which are the flash memory blocks (for example, write pages) that got written between in the time period that happened between the two markers. Knowing the physical flash memory blocks that got written, the synchronous mirroring module can query the flash management layer for information on the logical memory blocks corresponding to the determined physical blocks.

The flash management layer maintains the mapping between logical memory blocks and the physical memory blocks that got written using the flash translation table 530. Based on information from the markers, the synchronous mirroring module asks the reverse question, that is, what is the logical memory block that the physical flash block corresponds to, given the physical flash block that got written.

In some implementations, using the information on the active segments at the active server and the markers stored in the passive server, the functionalities of a disaster recovery log and the un-replicated write log may be reproduced. The synchronous mirroring module 550 on the active server periodically queries (for example, every few seconds) the flash management layer on the active server on the sequence number(s) of the current active segments and the offset(s) for the next available memory block within the active segment(s). The synchronous mirroring module 550 sends the information to the passive server on the other end of the connection in the synchronous mirroring setup. The passive server records the received information as the latest marker value received from the active server.

When the synchronous mirroring system recovers from a crash, the active and the passive servers reach agreement upon the last marker that has been seen from each other. In some implementations, the synchronous mirroring module on the passive server sends to the active server the last marker that the passive server had received before the crash. The synchronous mirroring module on the active server queries the flash management layer on the active server for the sequence number(s) of the active segment(s).

The synchronous mirroring module compares the sequence number(s) of the active segment(s) that are retrieved from the flash management layer with the sequence number(s) of the segment(s) indicated in the marker received from the passive server. The difference between the sequence number(s) corresponds to all the writes that might have taken place at the active server that are not replicated at the passive server. Therefore, the active server effectively has the disaster recovery log information.

The synchronous mirroring module on the active server queries the flash management layer to verify that the physical flash blocks corresponding to the writes identified above to continue to represent valid logical blocks. That is, the physical flash blocks include data that are mapped accurately by the corresponding logical blocks. This check is performed since situations may arise, for example, where a physical flash block was erased and/or had new data written to it, but the logical block that previously mapped to the physical block was not updated.

If the synchronous mirroring module verifies that the physical flash blocks corresponding to the identified writes continue to represent valid logical blocks, then the synchronous mirroring module retrieves the writes and the logical memory blocks corresponding to the identified writes and sends them to the passive server. On the other hand, if the synchronous mirroring module determines that one or more physical flash blocks corresponding to the identified writes no longer represent valid logical blocks, then the synchronous mirroring module does not send the associated writes or the incorrect logical memory blocks. In such cases, the synchronous mirroring module retrieves the remaining writes and the corresponding logical memory blocks (which continue to be valid) and sends them to the passive server.

When the synchronous mirroring module on the active server sends the active segment sequence number information to the passive server, the system has to ensure that there is no write operation that got started before the information was sent, but finished after the information was transmitted. This may be regarded as a "write barrier," which is needed for correctness in that there cannot be operations that appear on both sides of a marker because the marker is used as a synchronization device.

Consider two user writes that were issued before synchronous mirroring module 550 on the active server queries the flash management layer for information on the active segments, but the two user writes are not completed by the time the information is sent from the flash management layer. It may be possible that, with regard to the order in which the two user writes and the active segment information are communicated to the passive server, the ordering might be different from the ordering on the active server. One of the writes might actually happen before the active segment information is received on the passive node, while the other write may happen after. Because there is the possibility of confusion in the order on the active server and the passive server, the synchronous mirroring setup may not be correct because the synchronous mirroring modules on the active server might wrongly interpret both writes as having been recorded on the passive server while in actuality only one of the writes may have been recorded. While performing recovery using the markers stored by the passive server, because the second write on the active server was performed before the active segment information was retrieved, as part of the recovery process, the second write will not get shipped to the passive server. The synchronous mirroring system will not be aware that the write operation was missed. Therefore, for synchronous mirroring using a marker-based scheme to be correct, write operations should be ordered strictly before and after the retrieved marker information on the active segment in order to remove the confusion of what could have happened with the writes that happened concurrently with the retrieving the marker information.

In the implementation described in the previous section, the write barrier may be achieved by stopping the I/O operations when the sequence number information is being collected and transmitted. The synchronous mirroring system ensures that all writes operations in the system have finished before the information on the active segments is retrieved from the flash management layer. New writes are not allowed in the system until the marker information has been retrieved, and then write operations are resumed. However, this may generate "hiccups" in the system in the context of performing I/O operations. Both stopping, waiting for the writes to be finished and preventing new writes from proceeding until the information has been returned by the flash management layer may increase the response times. For example, if the information corresponding to the active segment(s) is collected every two seconds, there is a few milliseconds worth of time when the I/O operations are not performed.

In some implementations, the write barrier may be achieved without incurring hiccups using a two-level marker scheme, which may be known as the red-black marker scheme. In such implementations, the write operations on the active server are performed in phases, with the write transactions on the active server categorized into one of two types, which may be referred to, for illustrative purposes, as a red phase (or red writing phase) and a black phase (or black writing phase).

The write operations are performed on the active server in the order of a red phase, followed by a black phase, followed by a red phase and so on. While performing a write operation in the red phase, the flash management layer retrieves the information for the segment that was active in the last black phase. While performing a write operation for the black phase, the flash management layer retrieves the information on the active segment corresponding to the last red phase. Therefore, the synchronous mirroring system overlaps the segment information retrieval and the new write operations that are coming into the system.

In some implementations, when write operations are performed in the black phase, the flash management layer retrieves the sequence number(s) of the segment(s) that are active in the black phase (and the sequence number(s) of the memory blocks within the active segment(s) that are written) and stores them in the DRAM record for the active segments with an indication that the sequence number(s) being stored corresponding to the active segments in the black phase. Similarly, during write operations in the red phase, the flash management layer may store the sequence number(s) of the active segment(s) in the DRAM record with an indication that the sequence number(s) being stored corresponding to the active segments in the red phase. For example, if the memory server 500 represents an active server, segment 522 may have been the active segment in the black phase. Accordingly, the flash management layer stores in the DRAM record the sequence numbers of segment 522 and the memory block within segment 522 that was just written, indicating that the sequence numbers are associated with the black phase. At the next red phase, both segments 522 and 524 may be written. The flash management layer stores in the DRAM record the sequence numbers of segments 522 and 524 (along with the sequence numbers of the memory blocks within the respective segments), indicating that the sequence numbers are associated with the red phase.

In some implementations, the flash management layer may maintain separate DRAM records corresponding to the different phases. In such implementations, a first DRAM record may be used to store sequence numbers corresponding to the active segments in the black phase, while a second DRAM record may be used to store sequence numbers corresponding to the active segments in the red phase, and so on.

The property provided by the information on active segment(s) retrieved by the flash management layer is that the information is accurate up to the last phase that it represents. The information may not be accurate for the current write operations that are performed while the information is retrieved.

When a write operation corresponding to the red phase is being performed while the information on the active segment(s) corresponding to the black phase is being retrieved, the red phase write operation does not have to stop for the black phase active segment information to be retrieved. The write operation corresponding to the red phase may continue. However, all previous write operations corresponding to the black phase should have completed before the black phase active segment information is retrieved, and the new write operations in the black phase may not start until retrieval of the black phase active segment information has completed.

Pipelining of the synchronous mirroring operations is achieved by categorizing the write operations and writing to the active segments in different phases at different times. The write barrier is addressed by working with two markers, disaggregating the writes into phases, and retrieving the segment and block sequence numbers corresponding to the last completed phase.

It is to be noted that the information that is sent to the passive server in the two-level marker scheme includes the sequence numbers corresponding to all the active segments that were written in the last writing phase. The segments may include some segments that are also active in the current writing phase.

On the passive server, the sequence number information received from the active server are stored as markers. In implementations that utilize the two-level marker scheme, the passive server may store multiple markers. For example, the server 500, when taken to represent a passive server, may store markers 542 and 544. Marker 542 may include the sequence numbers corresponding to active segments in the black phase, while marker 544 may include the sequence numbers corresponding to the active segments in the red phase.

In some implementations, the passive server may store the information identifying the writing phase associated with the markers. In the example described above, the passive server may store information identifying the marker 542 as being associated with the black phase, and the marker 544 as being associated with the red phase.

In some implementations of the two-level marker scheme, when the passive server sends a marker to the active server during a crash recovery, the passive server sends the second-last marker corresponding to the information it had received from the active server. This is done to ensure that no data is lost during partial re-synchronization due to the write barrier issue described previously, since the second-last marker at the passive server corresponds to the previous writing phase at the active server.

For example, the active server sends the sequence numbers associated with the active segments in the black writing phase at a time when the red writing phase is active. The sequence numbers are stored in marker 542 at the passive server. At a subsequent time, the active server sends the sequence numbers associated with the active segments in the red writing phase, which are stored in the marker 544 at the passive server. The passive server undergoes a failure after storing the marker 544. Therefore, when the passive server is again operational, the last marker stored at the passive server is 544, while the second-last marker is 542. During the recovery operations, the passive server sends the sequence numbers stored in marker 542 to the active server.

In the two-level marker implementation, when sending the sequence numbers to the active server for partial re-synchronization after a crash recovery, the passive server also may specify the associated writing phase. In such implementations, the synchronous mirroring module 550 in the active server may specify the writing phase corresponding to which the active segment information is sought when sending a query to the flash management layer for the active segments based on the marker information received from the passive server. The flash management layer accordingly responds with the sequence numbers of the most recent active segments corresponding to the queried writing phase.

The synchronous mirroring module 550 in the active server compares the sequence numbers of the of the most recent active segments that are retrieved from the flash management layer, to the sequence numbers included in the marker received from the passive server. The difference between the sequence numbers returned from the flash management layer and the sequence numbers mentioned in the marker from the passive server indicates the write operations that have been performed at the active server since the segments corresponding to the sequence numbers mentioned in the marker from the passive server were sent to the passive server. The determined write operations may not have been performed at the passive server due to the crash. The above assumes that the sequence numbers are higher for segments that are written later in time, compared to sequence numbers for segments that are written later in time.

One the write operations that may not have been written to the passive server due to the crash are determined, the synchronous mirroring module 550 may query the flash management layer to confirm that the physical flash blocks corresponding to the write operations identified above to continue to represent valid logical blocks, as described previously.

If the synchronous mirroring module 550 verifies that the physical flash blocks corresponding to the identified writes continue to represent valid logical blocks, then the synchronous mirroring module retrieves the writes and the logical memory blocks corresponding to the identified writes and sends them to the passive server. On the other hand, if the synchronous mirroring module 550 determines that one or more physical flash blocks corresponding to the identified writes no longer represent valid logical blocks, then the synchronous mirroring module does not send the associated writes or the incorrect logical memory blocks. In such cases, the synchronous mirroring module retrieves the remaining writes and the corresponding logical memory blocks (which continue to be valid) and sends them to the passive server.

It is to be noted that, in some implementations, when the active server receives a marker from the passive server that indicates a writing phase associated with the marker, the active server may be performing new write operations corresponding to the indicated writing phase. For example, the active server receives from the passive server marker 542 with information indicating that the sequence numbers included in the marker 542 were written during a black writing phase. At the time the active server receives marker 542, the active server may be performing new write operations in a new cycle of the black writing phase.

In some other implementations, when the active server receives a marker from the passive server that indicates a writing phase associated with the marker, the active server may be performing new write operations corresponding to a different writing phase. For example, the active server receives from the passive server marker 542 with information indicating that the sequence numbers included in the marker 542 were written during a black writing phase. At the time the active server receives marker 542, the active server may be performing new write operations in a cycle of the red writing phase.

Although the two-level marker scheme is described in the preceding section with reference to red and black phases, it will be understood that the colors attributed to the writing phases are merely for illustrative purposes, and have no bearing to the functionality of the implementations. Other colors, or some other suitable identifying information different from a color, may be assigned to the different categories and phases without altering the implementations described.

Furthermore, although the preceding section describes the concept of a two-level marker scheme, the implementations may be equally applicable to systems that employ a multi-level marker scheme that is different from the two-levels illustrated above. In such cases, there may be multiple writing phases, with a different marker associated with each writing phase.

In some implementations, the synchronous mirroring system may use a two-level marker scheme in which the segments are categorized into one of two phases, such as a blue phase and a green phase, and the write operations are written to different active segments in different phases. When the symmetric receives a write operation when the blue phase is active, the synchronous mirroring module performs the write operation on an active segment associated with the blue phase. When a write operation is received in the green phase, the synchronous mirroring module performs the write operation on an active segment associated with the green phase, which may be different from the active segment associated with the blue phase.

Different markers may be associated with different phases, and the markers may be separately updated when their corresponding phases are active. For example, there may be a marker for the blue phase and a different marker for the green phase described above.

The above implementation may be extended to a multi-level marker scheme in which the segments are categorized into one of several categories, in a manner similar to that described above with reference to the blue and green phases. In such cases, different markers may be associated with each of the different phases, and the markers may store information corresponding to the active segments in their respective phases. However, in some cases, the markers may be agnostic regarding the different phases. In such implementations, each marker may store information corresponding to the active segments in all the phases.

The implementations described in the preceding section, which provide synchronous mirroring using the concept of markers, make the memory write operations more efficient. For example, the latency associated with writing to the disaster recovery log and/or the un-replicated write log are eliminated. Uniformity of performance is achieved irrespective of whether the write operations are sequential or random in nature. By relying on the internals of the flash-management layer instead of on additional disaster recovery log or un-replicated write log, more robustness of performance may be obtained due to fewer variations between workloads.

In implementations that employ the disaster recovery log, an additional write amplification component is added, which refers to the additional memory that is processed to write a certain small amount of data. Therefore, if the geometry of the flash memory allows a bounded number of writes against the flash storage media, the disaster recovery log may reduce the lifetime of the flash memory media for data writes. For example, assuming a workload that was doing 4 KB writes, for every 4 KB write one disaster recovery log write is performed to open the write, perform the 4 KB write and then another disaster recovery log write to close the write, the system effectively introduced a write amplification of 3×. Therefore, the flash memory device may support overall one-third the number of data writes over its lifetime as compared to when the case when it is used for in a non-synchronous mirroring fashion.

Therefore, if the additional writes due to the disaster recovery log can be avoided, a longer lifetime may be achieved from that storage element (for example, 3 time more in the example above) compared to the alternate situation. This may be possible using the concept of markers for synchronous mirroring. Therefore, synchronous mirroring using markers provides higher performance, higher endurance and performance that is more predictable across different workloads.

Figure 6:
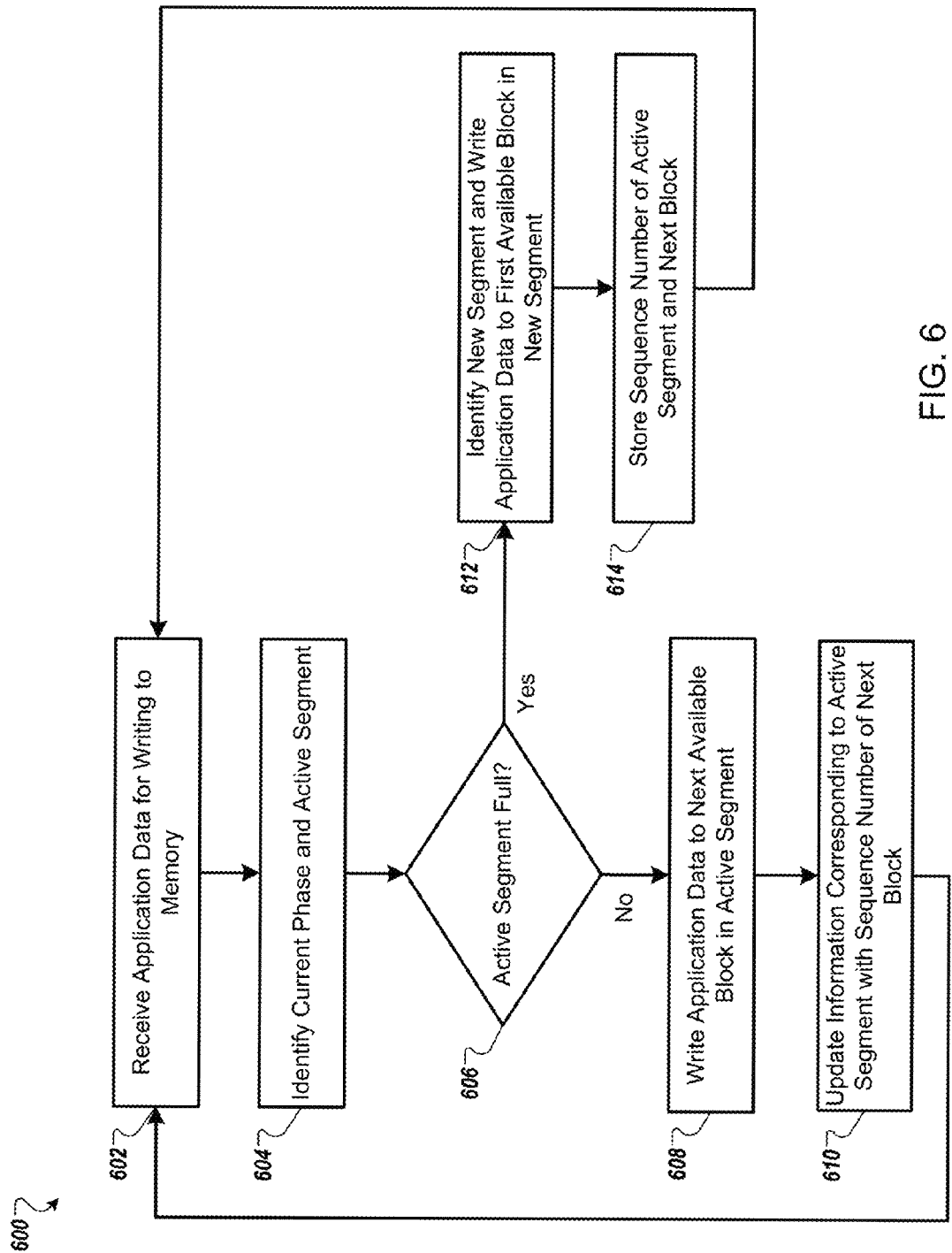
FIG. 6 illustrates an example process that may be used for writing data to memory blocks in a memory server.

FIG. 6 illustrates an example process 600 that may be used for writing data to memory blocks in a memory server. The process 600 may be performed by the active server in a synchronous mirroring implementation, for example, by the memory server 500. Accordingly, the following sections describe the process 600 as performed by the flash management layer in the memory card 501, which includes the master controller 502, the slave controllers 514, 516, 51J, 51K, and the flash translation table 530. However, the process 600 also may be performed by other systems and system configurations.

The process 600 receives application data for writing to memory (602). For example, the memory server 500 may receive write operations from higher-level applications or the operating systems. The write operations may include data for storing in the persistent storage associated with the memory server 500, such as the flash memory dice 504, 506, 51J or 51K in the memory card 501.

The current phase and the active segment are identified (604). For example, the memory server 500 may implement a two-level marker scheme for storing data in the memory card 501. Accordingly, upon receiving a write operation, the flash management layer in the memory card 501 determines which of the two phases, the red phase or the black phase, is currently active for writing data. The flash management layer also determines the active segment where the data is to be written in the current writing phase, for example by looking up the sequence number of the active segment from the record maintained in the DRAM.

The flash management layer determines whether the active segment is full (606). For example, the flash management layer checks whether all the write pages in the active segment for the current phase have been filled with data.

If the active segment is determined as not full, the flash management layer writes the application data to the next available block in the active segment (608). For example, the active segment may be 524. The flash management layer may determine the next available write page within segment 524 and store the application data in the next available write page. In this context, even though a segment is described as a collection of erase blocks distributed across the flash memory dice in a RAID stripe, when writing to the segment, the data is written at the granularity of the write pages within the segment. As described previously, each erase block includes multiple write pages.

After writing to the next available block in the active segment, the flash management layer updates the information corresponding to the active segment with the sequence number of the next block (610). For example, the flash management layer may store the sequence number of the next write page that is available in the active segment following the write page that was just written. The information may be stored as part of the DRAM record where the sequence numbers of the active segments are maintained. The flash management layer then receives the next application data from the higher level and proceeds to store the data in the physical memory.

On the other hand, if the active segment is determined to be full, the flash management layer identifies a new segment and writes the application data to the first available block in the new segment (612). For example, the flash management layer may determine that there is no space available in the active segment. Consequently, the flash management layer identifies the next segment that is available for the writing as the new segment for storing data, and associates a sequence number with the newly identified segment. Since segments are used sequentially, the sequence number associated with the new segment is the next higher number compared to the sequence number of the segment that just got filled. Upon identifying the new segment, the flash management layer writes the application data to the first write page in the new segment.

The flash management layer stores the sequence number of the active segment and the next block (614). For example, when the next available segment is selected for writing, the flash management layer identifies the newly-selected segment as a new active segment, and stores the sequence number of the new active segment in internal data structures that track the active segment, such as the DRAM record where the sequence numbers of the active segments are maintained.

In some implementations, the flash management layer also stores the sequence number of the next write page that is available in the active segment following the write page that was just written. The flash management layer then receives the next application data from the higher level and proceeds to store the data in the physical memory.

Figure 7:
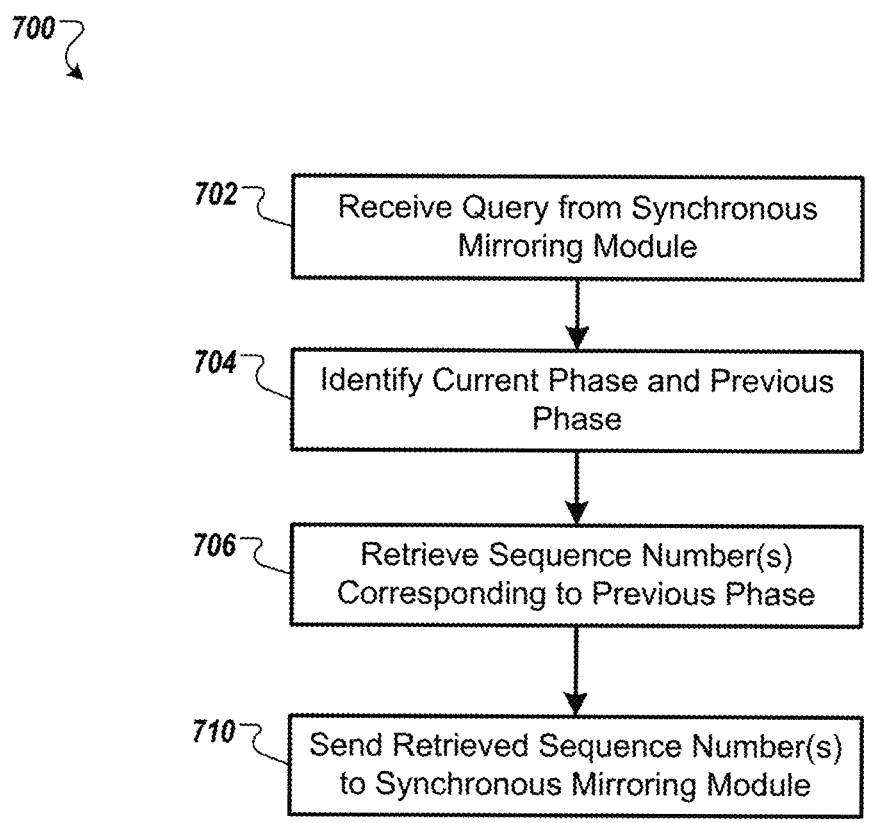
FIG. 7 illustrates an example process that may be used for identifying active flash segments in a memory server that implements synchronous mirroring.

FIG. 7 illustrates an example process 700 that may be used for identifying active flash segments in a memory server that implements synchronous mirroring. The process 700 may be performed by the active server in a synchronous mirroring implementation, for example, by the memory server 500. Accordingly, the following sections describe the process 700 as performed by the flash management layer in the memory card 501, which include the master controller 502, the slave controllers 514, 516, 51J, 51K, and the flash translation table 530. However, the process 700 also may be performed by other systems and system configurations.

The active server may perform the process 700 concurrently with the process 600. For example, the process 700 may be used to retrieve the information on the active segment(s) corresponding to the previous phase (such as the black phase) in a two-level marker scheme, while the process 600 is simultaneously performed to store data in the active segment(s) in the current phase (such as the red phase).

The process 700 is performed when a query is received from the synchronous mirroring module (702). For example, the memory server 500 may be the active server in a synchronous mirroring implementation. The flash management layer in the active server, such as the flash management layer in the memory card 501, may receive a query from the synchronous mirroring module 550 for information on the active segment(s).

The flash management layer identifies the current phase and the previous phase (704). For example, upon receiving the query from the synchronous mirroring module 550, the flash management layer in the memory card 501 determines which of the two phases in the two-level marker scheme is the current writing phase and accordingly, which phase was written in the previous cycle. The flash management layer may determine that the red phase is currently active, and therefore, the black phase was written to in the previous round.

The flash management layer retrieves the sequence number(s) of the active segment(s) corresponding to the previous phase (706). As described previously, in the two-level marker scheme, information on the active segments that are sent to the synchronous mirroring module correspond to the information that were updated in the previous writing phase. For example, if the red phase is currently active, the flash management layer retrieves, for example from the DRAM record that stores the information on the active segments, the sequence number(s) of the active segment(s) that were written in the previous cycle when the black phase was active. Along with the sequence number(s) of the active segment(s) corresponding to the previous phase, the flash management layer retrieves the offset(s) within the active segment(s) that denote the next available memory block(s) within the active segment(s).

In some implementations, the sequence number(s) may be retrieved from their storage locations in the flash memory dice. For example, if 522 corresponds to the active segment that was written in the previous phase, the flash management layer retrieves the information on 522 from the location 522a in the flash memory 504.

The flash management layer sends the retrieved sequence numbers to the synchronous mirroring module (710). For example, the flash management layer sends the retrieved sequence number(s) of the active segment(s) corresponding to the previous phase to the synchronous mirroring module 550. In some implementations, the flash management layer also sends the offset(s) within the active segment(s) corresponding to the previous phase that denote the next available memory block(s) within the respective segment(s). However, in other implementations, the flash management layer sends only the sequence number(s) of the active segment(s). Consequently, the synchronous mirroring module 550 has information on which portions of the storage element in the active server were most recently written.

Figure 8:
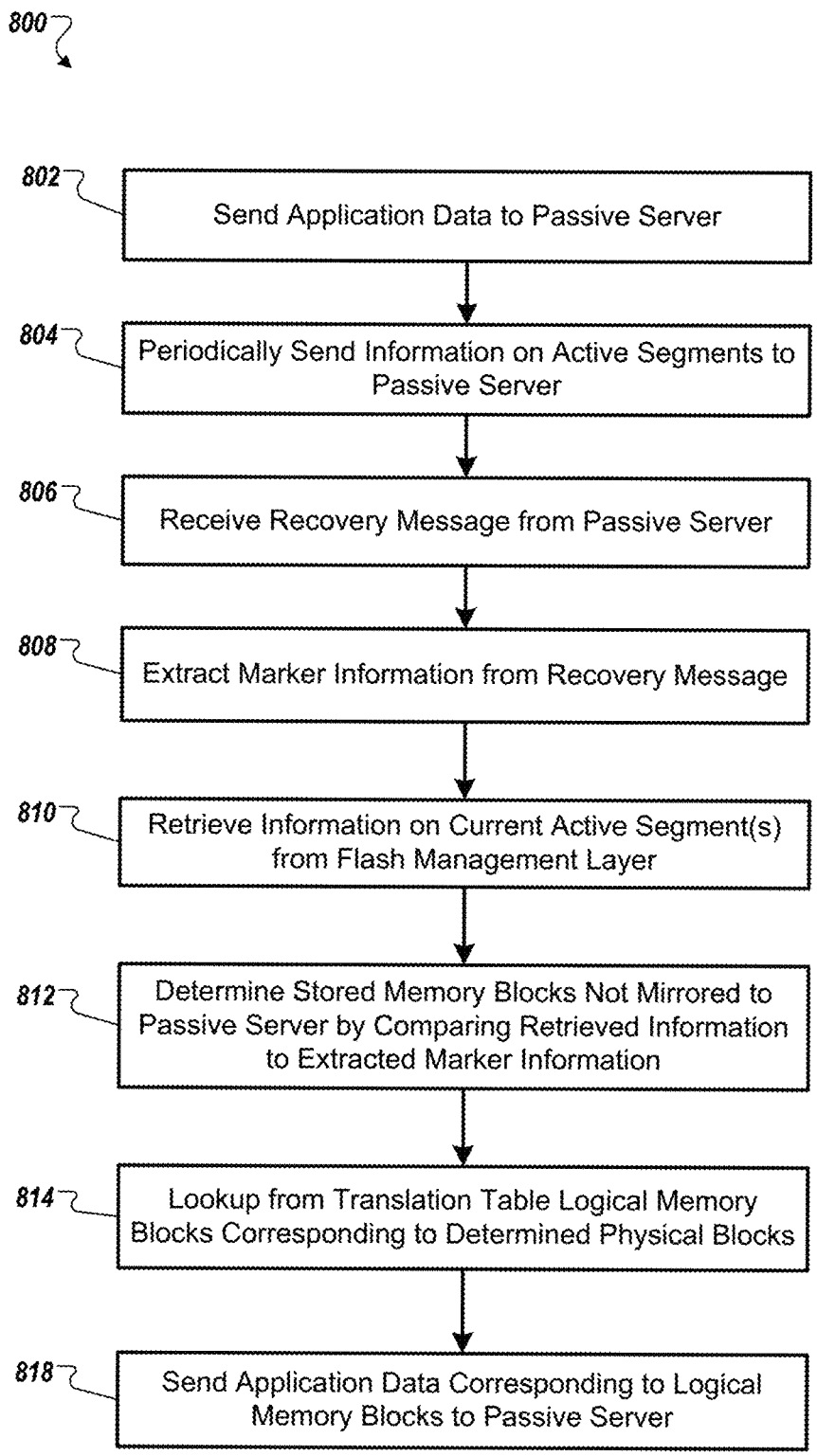
FIG. 8 illustrates an example process that may be used for performing synchronous mirroring between active and passive memory servers that use flash-based storage.

FIG. 8 illustrates an example process 800 that may be used for performing synchronous mirroring between active and passive memory servers that use flash-based storage.

The process 800 may be performed by the active server in a synchronous mirroring implementation, for example, by the memory server 500 representing the active server in a synchronous mirroring setup. Accordingly, the following sections describe the process 800 as performed by the synchronous mirroring module 550 in the memory server 500, by interacting with the flash management layer in the memory card 501, which includes the master controller 502, the slave controllers 514, 516, 51J, 51K, and the flash translation table 530. However, the process 800 also may be performed by other systems and system configurations.

As part of the process 800, the synchronous mirroring module sends the application data to the passive server (802). For example, the memory server 500 may receive write operations from the higher level application, such as the user applications, and/or the operating system. The memory server 500 writes the data received along with the write operations to the local storage element, for example to the memory card 501 using the flash management layer on the memory card 501. At the same time, the synchronous mirroring module 550 in the memory server 500 sends the write operations including the data to the passive server that mirrors the data being written to the memory card 501.

In some implementations, the synchronous mirroring module 550 sends the write operations to the passive server only when the memory server 500 is the active server in the synchronous mirroring configuration. In some implementations, the synchronous mirroring configuration may include multiple passive servers, apart from the memory server 500 configured as the active server. In such implementations, the synchronous mirroring module 550 may send the write operations to one or more of the passive servers.

The synchronous mirroring module periodically sends information on the active segments to the passive server (804). For example, the synchronous mirroring module 550 queries the flash management layer on the local storage element (that is, the memory card 501) for information on the flash segments recently written. The query may be made periodically at regular intervals in time. Alternatively, the query may be made when a certain threshold number of write operations are sent to the passive server. Alternatively, the query may be made when a certain threshold capacity of the physical memory on the local storage element are written to. For example, the query may be made when a certain percentage (such as 5%) of the available capacity of the flash memory dice on the memory card 501 are filled up. The synchronous mirroring module 550 may track the available capacity of the memory card 501 to make the query.

Based on the query, the synchronous mirroring module 550 receives from the flash management layer information on the active segments, as described previously. The information may include the sequence number of the active segment, and the offset within the segment corresponding to the next available memory block in the active segment. In some implementations, there may be multiple active segments and the information received from the flash management layer may include the sequence numbers and offsets corresponding to all the active segments. The synchronous mirroring module 550 sends the information on the active segments to the passive server(s) that mirror the data stored in the active server 500.

In implementations that use multi-level marker scheme, such as the two-level red-black marker scheme described previously, the synchronous mirroring module 550 also may send to the passive server information on the writing phase corresponding to the active segments, as described previously. For example, when sending the sequence number of the active segments that are written in the black phase, the synchronous mirroring module 550 also sends information indicating that the writing phase is the black phase.

The synchronous mirroring module receives a recovery message from a passive server (806). For example, a passive server that was mirroring the data stored in the active server 500 may fail for some reason. When the passive server recovers from the failure, the passive server may send a recovery message to the active server 500 to perform a partial re-synchronization of the data that may have been written at the active end during the time period the passive server was stopped. The recovery message is processed by the synchronous mirroring module 550 in the active server 500.

The synchronous mirroring module extracts marker information from the recovery message (808). For example, upon recovering from a failure condition, the passive server retrieves the last marker that was received from the active end, and sends the last marker to the active server 500 as part of the recovery message. The synchronous mirroring module 550 in the active server 500 reads the marker information by processing the recovery message.

The synchronous mirroring module retrieves information on the current active segment(s) from the flash management layer (810). For example, to determine the flash memory blocks that may have been updated since the passive server had failed, the synchronous mirroring module 550 sends a query to the flash management layer in the local storage element, that is, the memory card 501. The flash management layer responds with information on the one or more segments that are active at the time the query is received by the flash management layer. The synchronous mirroring module can determine, from the flash management layer, the one or more segments, along with the memory blocks within the segment, that were most recently updated.

In implementations that utilize the two-level marker scheme, the marker received from the passive server includes information on the writing phase with which the marker is associated (for example, whether the marker is associated with the red phase or the black phase). In such cases, the passive server stores two markers corresponding to the two writing phases. When sending a marker to the active server for data recovery, the passive server sends the second-last marker that it had received. As described previously, the second-last marker is sent to ensure that during partial re-synchronization, no data is lost due to the write barrier, since the second last marker received by the passive server corresponds to the previous writing phase at the active server.

The synchronous mirroring module determines stored memory blocks that are not mirrored to the passive server by comparing the retrieved information to the extracted marker information (812). For example, the synchronous mirroring module 550 may determine, based on the information extracted from the marker received from the passive server, the sequence number(s) of the last segment(s) that have been stored by the passive server. The synchronous mirroring module 550 also may determine, from the information sent by the flash management layer of the local storage element, the sequence number(s) of the latest segment(s) that have been written to the local storage. The difference of the two sequence number(s) gives the segment(s) that have been written to the local storage, but not stored in the passive server. Therefore, the data stored in these segments have not been mirrored to the passive server, for example, because the passive server had failed at the time the corresponding write operations had been sent to the passive server by the synchronous mirroring module 550 on the active server.

The synchronous mirroring module looks up from the translation table the logical memory blocks corresponding to the determined physical blocks (814). For example, the segments determined to have been written to the local storage, but not stored in the passive server, provide information on the physical memory in the memory card 501. The synchronous mirroring module 550 may query the flash management layer on the memory card 501 to map the physical memory blocks to the logical memory blocks, which may be the logical memory blocks associated with the write operations that were missed by the passive server when it had failed. The flash management layer may look up the logical memory blocks corresponding to the physical memory blocks using the flash translation table 530, and send the information on the logical memory blocks to the synchronous mirroring module 550.

The synchronous mirroring module sends the application data corresponding to the logical memory blocks to the passive server (818). For example, the synchronous mirroring module 550 may determine, from the physical memory blocks, the raw application data stored in the memory card 501 but not stored in the passive server. Upon receiving the information on the logical memory blocks from the flash management layer, the synchronous mirroring module 550 also obtains the mapping of the physical memory blocks to the logical memory blocks. Consequently, the synchronous mirroring module 550 may send the logical memory blocks and the application data to the passive server.

The passive server stores the application data in its local physical memory, and uses the received information on the logical memory blocks to determine an identical mapping of the physical memory blocks where the application data is stored, to the logical blocks. In this manner, the data that was missed by the passive server when it had failed may be mirrored during the recovery phase. Accordingly, partial re-synchronization may be achieved without the use of the disaster recovery log and the un-replicated write log.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   receiving data for storing in a first asymmetric memory device, wherein latency of read operations is different from latency of write operations in asymmetric memory devices;
   identifying a first writing phase as an active writing phase in the first asymmetric memory device, wherein the first asymmetric memory device has at least the first writing phase and a second writing phase that are alternately active, each writing phase associated with a group of segments that are written when a corresponding writing phase is active, wherein a segment includes a logical mapping of physical memory locations in asymmetric memory devices and is associated with a portion of the physical memory locations that is erased in a single operation;
   upon the first writing phase being active, writing to a first group of segments that are associated with the first writing phase;
   upon the second writing phase being active, writing to a second group of segments that are associated with the second writing phase;
   identifying, in the first writing phase as the active writing phase, a first segment in the first group of segments that is available for writing data;
   writing the received data to a first memory block that is available in the first segment; and
   in connection with writing the received data to the first memory block in the first segment, storing information indicating that the first segment and the first memory block have been written in a latest instance of the first writing phase as the active writing phase.

2. The method of claim 1, the method further comprising:
   receiving, at the first memory device and from a synchronous mirroring module, a first query for information about a segment written in a most recently completed writing phase;
   in response to the first query, determining that the first writing phase has most recently completed and the second writing phase is the active writing phase;
   based on determining that the first writing phase has most recently completed, retrieving the stored information indicating that the first segment and the first memory block have been most recently written in the first writing phase; and
   sending the retrieved information to the synchronous mirroring module,
   wherein the synchronous mirroring module forwards, to a second asymmetric memory device, the information indicating that the first segment and the first memory block have been most recently written in the first writing phase, and
   wherein the information indicating that the first segment and the first memory block have been most recently written in the first writing phase is recorded in a first marker stored in the second asymmetric memory device, the first marker associated with the first writing phase.

3. The method of claim 2, further comprising:
   sending, by the synchronous mirroring module to the first asymmetric memory device subsequent to sending the first query, a second query for information about which segment has been written in a most recently completed writing phase;
   receiving, at the synchronous mirroring module, information indicating that the second writing phase is the most recently completed writing phase, and that a second segment and a second memory block have been most recently written in the second writing phase; and
   sending, by the synchronous mirroring module to the second asymmetric memory device, the information indicating that a second segment and a second memory block have been most recently written in the second writing phase,
   wherein the information indicating that a second segment and a second memory block have been most recently written in the second writing phase is recorded in a second marker stored in the second asymmetric memory device, the second marker associated with the second writing phase.

4. The method of claim 2, further comprising:
   receiving, at the synchronous mirroring module from the second asymmetric memory device, a message indicating that the second asymmetric memory device has recovered from a stoppage, wherein the message includes a copy of a marker that is recorded by the second asymmetric memory device before the stoppage, the marker identifying a recent segment and memory block written in the first asymmetric memory device;
   based on receiving the message, sending, by the synchronous mirroring module to the first asymmetric memory device, a second query for information about segments that have been most recently filled with data;
   receiving, at the synchronous mirroring module from the first asymmetric memory device, a response to the second query that includes information about a second segment and a second memory block that have been most recently written in the first asymmetric memory device;
   determining, by the synchronous mirroring module, information about the recent segment and the recent memory block from the copy of the marker included in the message;
   comparing, by the synchronous mirroring module, information about the recent segment and the recent memory block with the information about the second segment and the second memory block;
   based on the comparison, identifying, by the synchronous mirroring module, one or more new segments and new memory blocks written in the first asymmetric memory device that have not been recorded in the second asymmetric memory device;
   determining, by the synchronous mirroring module, whether the one or more new segments and new memory blocks represent valid data; and
   conditioned on determining that the one or more new segments and new memory blocks represent valid data, sending, by the synchronous mirroring module to the second asymmetric memory device, information about the one or more new segments and new memory blocks.

5. The method of claim 4, wherein determining whether the one or more new segments and new memory blocks represent valid data comprises determining whether physical memory blocks in the first asymmetric memory device are accurately mapped to logical blocks corresponding to the one or more new segments and new memory blocks.

6. The method of claim 4, further comprising:
   conditioned on determining that at least one of the one or more new segments and new memory blocks do not represent valid data, determining, by the synchronous mirroring module, information about remaining new segments and new memory blocks that represent valid data; and sending, by the synchronous mirroring module to the second asymmetric memory device, information about the remaining new segments and new memory blocks.

7. The method of claim 4, wherein the copy of the marker included in the message corresponds to one of the most recent marker recorded by the second asymmetric memory device before the stoppage, or the second most recent marker recorded by the second asymmetric memory device before the stoppage.

8. The method of claim 4, wherein the message from the second asymmetric memory device indicates that the marker included in the message is associated with the first writing phase, wherein the second query sent by the synchronous mirroring module includes a request for information about segments that have been most recently filled with data in the first writing phase, and wherein, the second segment and the second memory block included in the response to the second query are associated with the first writing phase.

9. The method of claim 2, wherein the stored information indicating that the first segment and the first memory block have been most recently written in the first writing phase is retrieved while data is concurrently written to a second memory block and second segment in the second writing phase.

10. The method of claim 9, wherein the second segment is same as the first segment, and wherein the second memory block is different from the first memory block.

11. The method of claim 2, wherein the two or more writing phases that are alternately active further includes a third writing phase, and wherein the second asymmetric memory device is configured to store separate markers associated with the separate writing phases, each marker recording information about a segment and a memory block that are most recently written in the associated writing phase.

12. The method of claim 2, wherein the second asymmetric memory device is configured to store a marker associated with the two or more writing phases that are alternately active, wherein the marker is configured to record information about segments and memory blocks that are most recently written in the two or more writing phases.

13. A system comprising:
one or more processors; and
instructions stored in a machine-readable medium that, when executed by the one or more processors, are configured to cause the one or more processors to perform operations comprising:
receiving data for storing in a first asymmetric memory device, wherein latency of read operations is different from latency of write operations in asymmetric memory devices;
identifying a first writing phase as an active writing phase in the first asymmetric memory device, wherein the first asymmetric memory device has at least the first writing phase and a second writing phase that are alternately active, each writing phase associated with a group of segments that are written when a corresponding writing phase is active, wherein a segment includes a logical mapping of physical memory locations in asymmetric memory devices and is associated with a portion of the physical memory locations that is erased in a single operation;
upon the first writing phase being active, writing to a first group of segments that are associated with the first writing phase;
upon the second writing phase being active, writing to a second group of segments that are associated with the second writing phase;
identifying, in the first writing phase as the active writing phase, a first segment in the first group of segments that is available for writing data;
writing the received data to a first memory block that is available in the first segment; and
in connection with writing the received data to the first memory block in the first segment, storing information indicating that the first segment and the first memory block have been written in a latest instance of the first writing phase as the active writing phase.

14. The system of claim 13, wherein the instructions are configured to cause the one or more processors to perform operations further comprising:
receiving, at the first memory device and from a synchronous mirroring module, a first query for information about a segment written in a most recently completed writing phase;
in response to the first query, determining that the first writing phase has most recently completed and the second writing phase is the active writing phase;
based on determining that the first writing phase has most recently completed, retrieving the stored information indicating that the first segment and the first memory block have been most recently written in the first writing phase; and
sending the retrieved information to the synchronous mirroring module,
wherein the synchronous mirroring module forwards, to a second asymmetric memory device, the information indicating that the first segment and the first memory block have been most recently written in the first writing phase, and
wherein the information indicating that the first segment and the first memory block have been most recently written in the first writing phase is recorded in a first marker stored in the second asymmetric memory device, the first marker associated with the first writing phase.

15. The system of claim 14, wherein the instructions are configured to cause the one or more processors to perform operations further comprising:
sending, by the synchronous mirroring module to the first asymmetric memory device subsequent to sending the first query, a second query for information about which segment has been written in a most recently completed writing phase;
receiving, at the synchronous mirroring module, information indicating that the second writing phase is the most recently completed writing phase, and that a second segment and a second memory block have been most recently written in the second writing phase; and
sending, by the synchronous mirroring module to the second asymmetric memory device, the information indicating that a second segment and a second memory block have been most recently written in the second writing phase,
wherein the information indicating that a second segment and a second memory block have been most recently written in the second writing phase is recorded in a second marker stored in the second asymmetric memory device, the second marker associated with the second writing phase.

16. The system of claim 14, wherein the instructions are configured to cause the one or more processors to perform operations further comprising:
   receiving, at the synchronous mirroring module from the second asymmetric memory device, a message indicating that the second asymmetric memory device has recovered from a stoppage, wherein the message includes a copy of a marker that is recorded by the second asymmetric memory device before the stoppage, the marker identifying a recent segment and memory block written in the first asymmetric memory device;
   based on receiving the message, sending, by the synchronous mirroring module to the first asymmetric memory device, a second query for information about segments that have been most recently filled with data;
   receiving, at the synchronous mirroring module from the first asymmetric memory device, a response to the second query that includes information about a second segment and a second memory block that have been most recently written in the first asymmetric memory device;
   determining, by the synchronous mirroring module, information about the recent segment and the recent memory block from the copy of the marker included in the message;
   comparing, by the synchronous mirroring module, information about the recent segment and the recent memory block with the information about the second segment and the second memory block;
   based on the comparison, identifying, by the synchronous mirroring module, one or more new segments and new memory blocks written in the first asymmetric memory device that have not been recorded in the second asymmetric memory device;
   determining, by the synchronous mirroring module, whether the one or more new segments and new memory blocks represent valid data; and
   conditioned on determining that the one or more new segments and new memory blocks represent valid data, sending, by the synchronous mirroring module to the second asymmetric memory device, information about the one or more new segments and new memory blocks.

17. The system of claim 16, wherein determining whether the one or more new segments and new memory blocks represent valid data comprises determining whether physical memory blocks in the first asymmetric memory device are accurately mapped to logical blocks corresponding to the one or more new segments and new memory blocks.

18. The system of claim 16, wherein the instructions are configured to cause the one or more processors to perform operations further comprising:
   conditioned on determining that at least one of the one or more new segments and new memory blocks do not represent valid data, determining, by the synchronous mirroring module, information about remaining new segments and new memory blocks that represent valid data; and
   sending, by the synchronous mirroring module to the second asymmetric memory device, information about the remaining new segments and new memory blocks.

19. The system of claim 16, wherein the copy of the marker included in the message corresponds to one of the most recent marker recorded by the second asymmetric memory device before the stoppage, or the second most recent marker recorded by the second asymmetric memory device before the stoppage.

20. The system of claim 16, wherein the message from the second asymmetric memory device indicates that the marker included in the message is associated with the first writing phase,
   wherein the second query sent by the synchronous mirroring module includes a request for information about segments that have been most recently filled with data in the first writing phase, and
   wherein, the second segment and the second memory block included in the response to the second query are associated with the first writing phase.

21. The system of claim 14, wherein the stored information indicating that the first segment and the first memory block have been most recently written in the first writing phase is retrieved while data is concurrently written to a second memory block and second segment in the second writing phase.

22. The system of claim 21, wherein the second segment is same as the first segment, and wherein the second memory block is different from the first memory block.

23. The system of claim 14, wherein the two or more writing phases that are alternately active further includes a third writing phase, and wherein the second asymmetric memory device is configured to store separate markers associated with the separate writing phases, each marker recording information about a segment and a memory block that are most recently written in the associated writing phase.

24. The system of claim 14, wherein the second asymmetric memory device is configured to store a marker associated with the two or more writing phases that are alternately active, wherein the marker is configured to record information about segments and memory blocks that are most recently written in the two or more writing phases.

25. A method comprising:
   receiving data for storing in a first asymmetric memory device, wherein latency of read operations is different from latency of write operations in asymmetric memory devices and wherein the asymmetric memory device includes a first writing phase and a second writing phase that are alternately active, each writing phase associated with a group of segments that are written when a corresponding writing phase is active, wherein a segment includes a logical mapping of physical memory locations in asymmetric memory devices and is associated with a portion of the physical memory locations that is erased in a single operation;
   identifying the first writing phase as an active writing phase in the first asymmetric memory device;
   identifying, in the first writing phase, a first segment for writing data;
   writing the received data to the first segment;
   in connection with writing the received data to the first segment, storing information indicating that the first segment has been most recently written in the first writing phase;
   receiving, at the first memory device and from a synchronous mirroring module, a first query for information about a segment written in a most recently completed writing phase;

determining that the first writing phase has most recently completed and the second writing phase is currently active;

in response to receiving the first query and based on determining that the first writing phase has most recently completed, retrieving the information indicating that the first segment has been most recently written in the first writing phase; and sending the information to the synchronous mirroring module, wherein the information is recorded in a first marker stored in a second asymmetric memory device, the first marker associated with the first writing phase.

* * * * *